Dec. 30, 1941.    S. A. HARRIS ET AL    2,268,283
BAG OR BOX MAKING MACHINE
Filed July 5, 1939    15 Sheets-Sheet 1

Inventors
S. A. Harris
T. H. Nifong
R. T. Stewart
Baldwin + Wight
their Attorneys

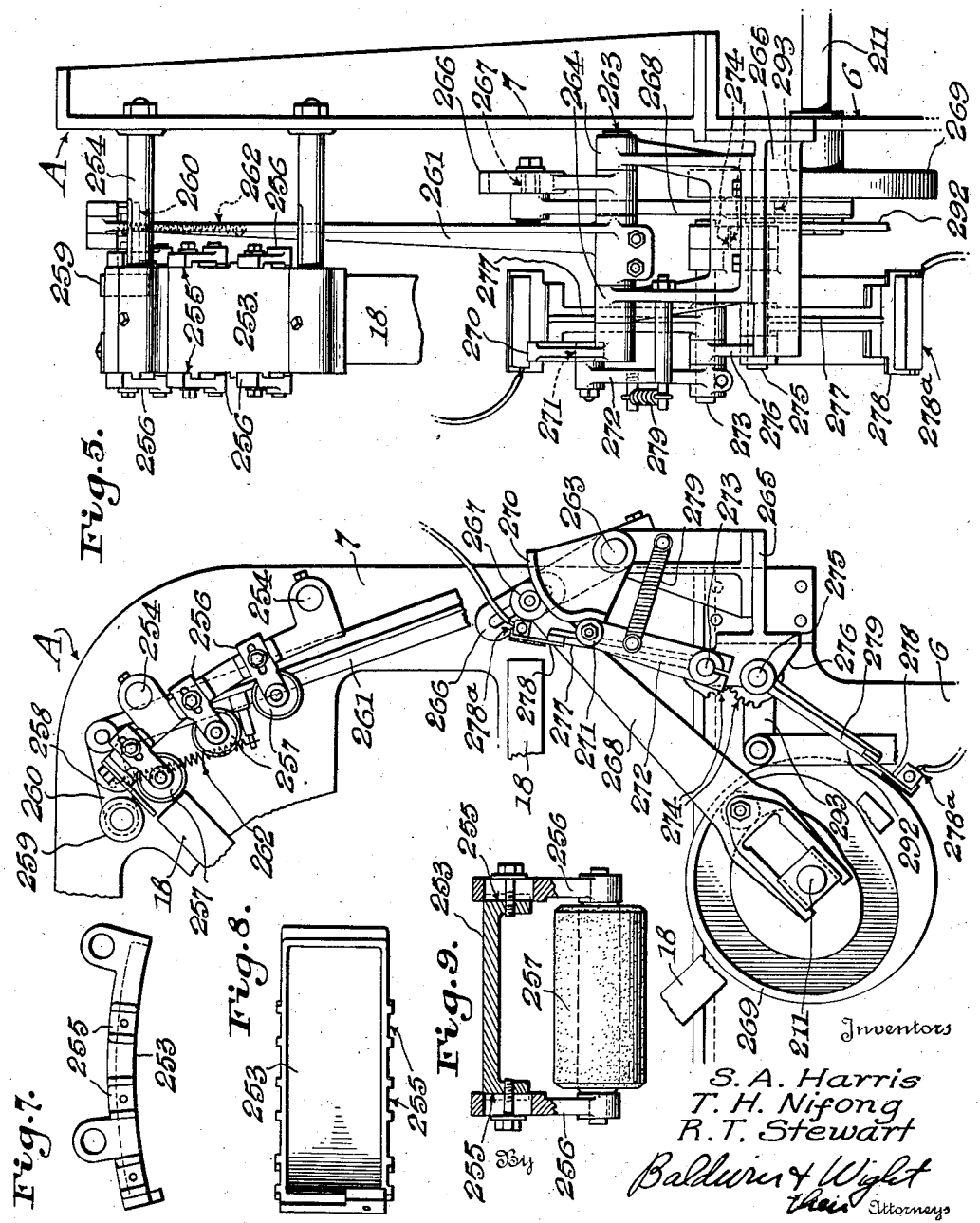

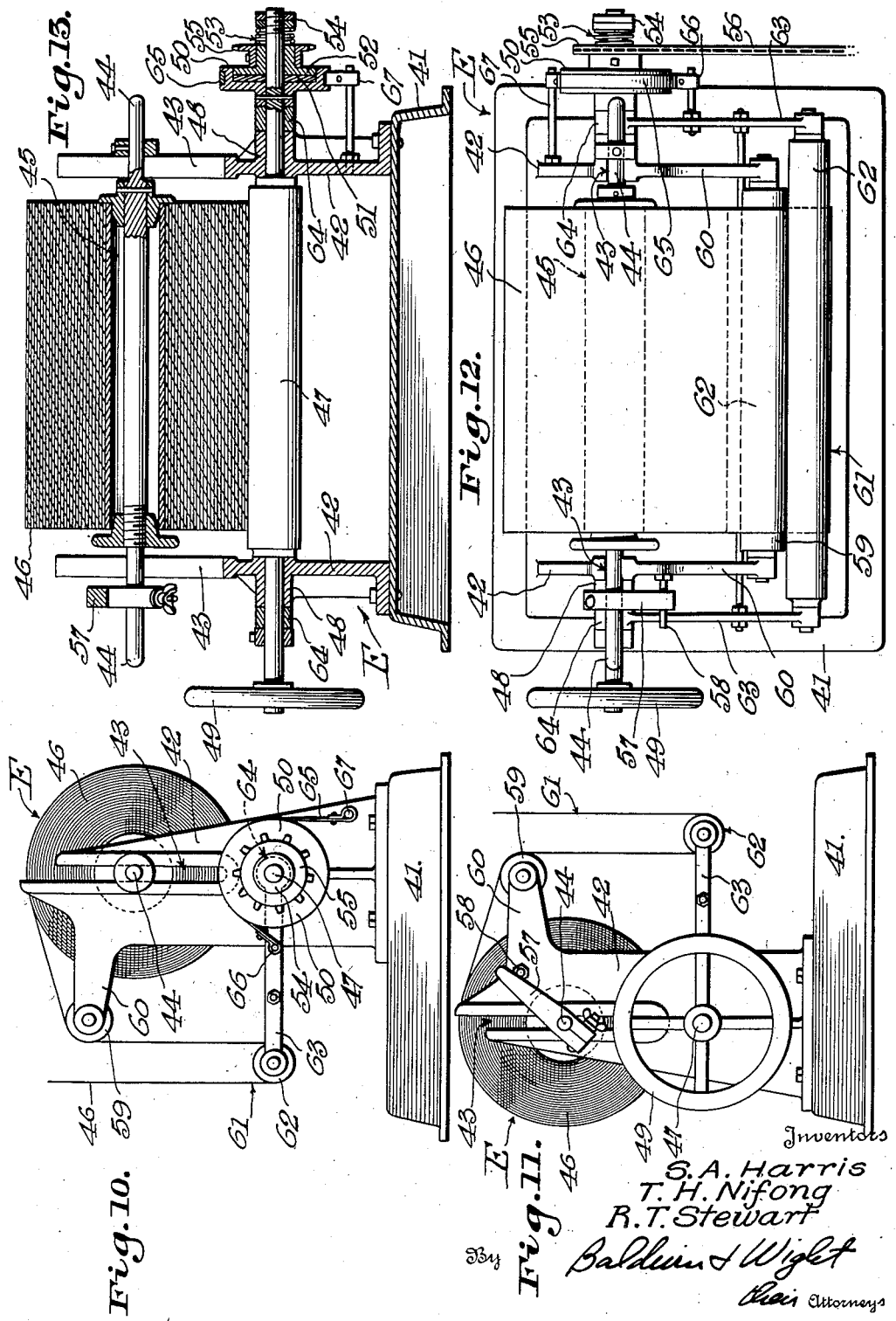

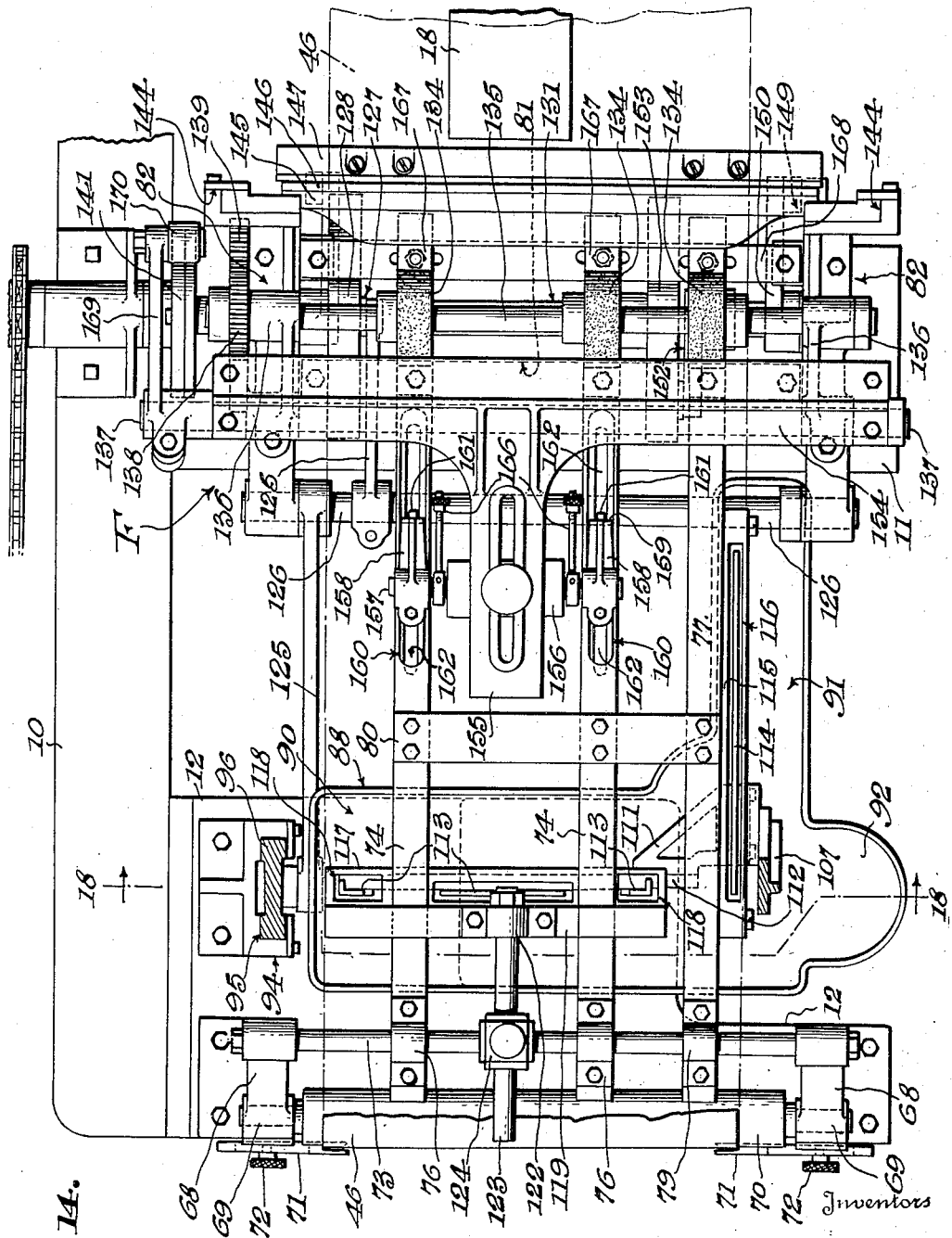

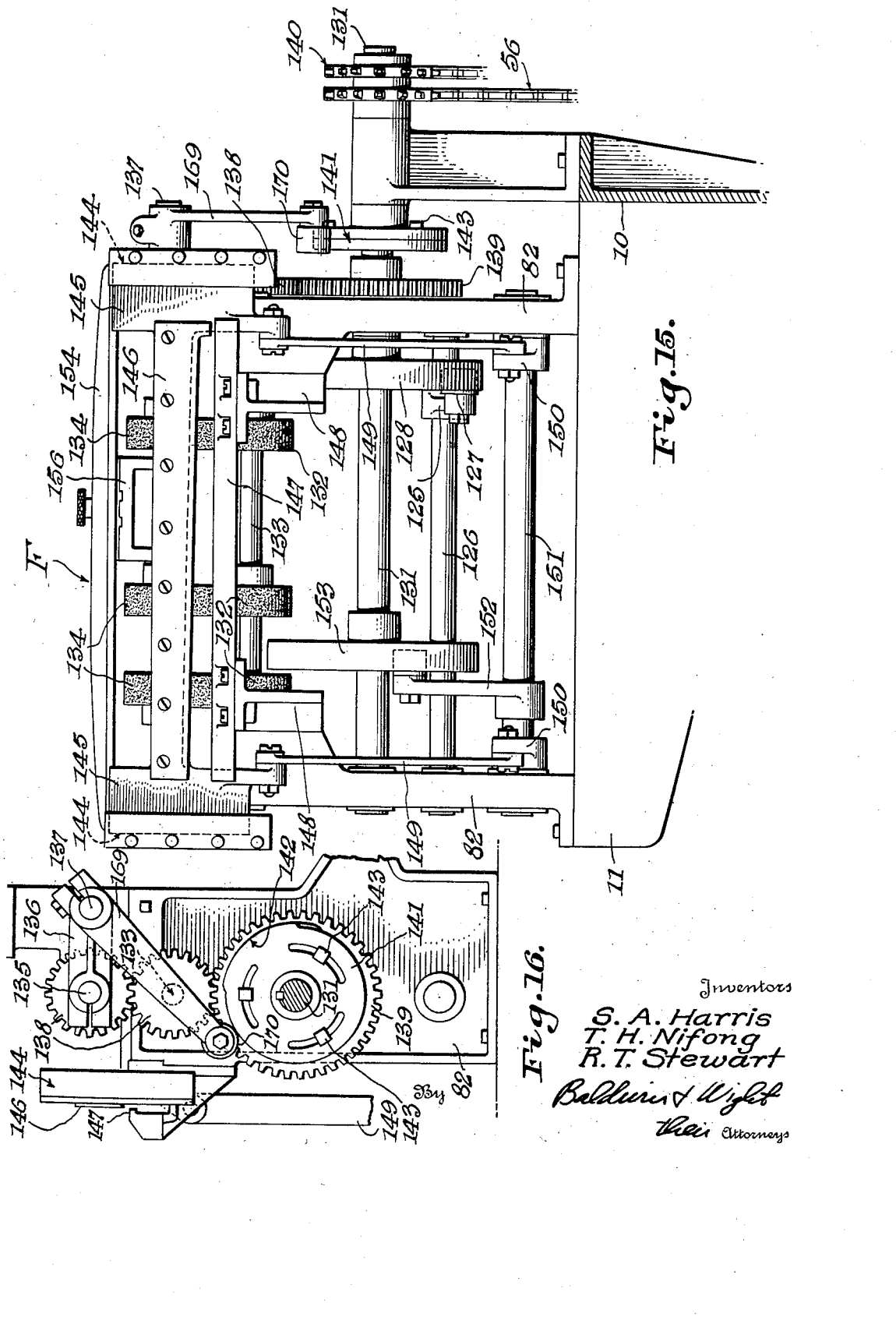

Dec. 30, 1941.  S. A. HARRIS ET AL  2,268,283
BAG OR BOX MAKING MACHINE
Filed July 5, 1939  15 Sheets-Sheet 9
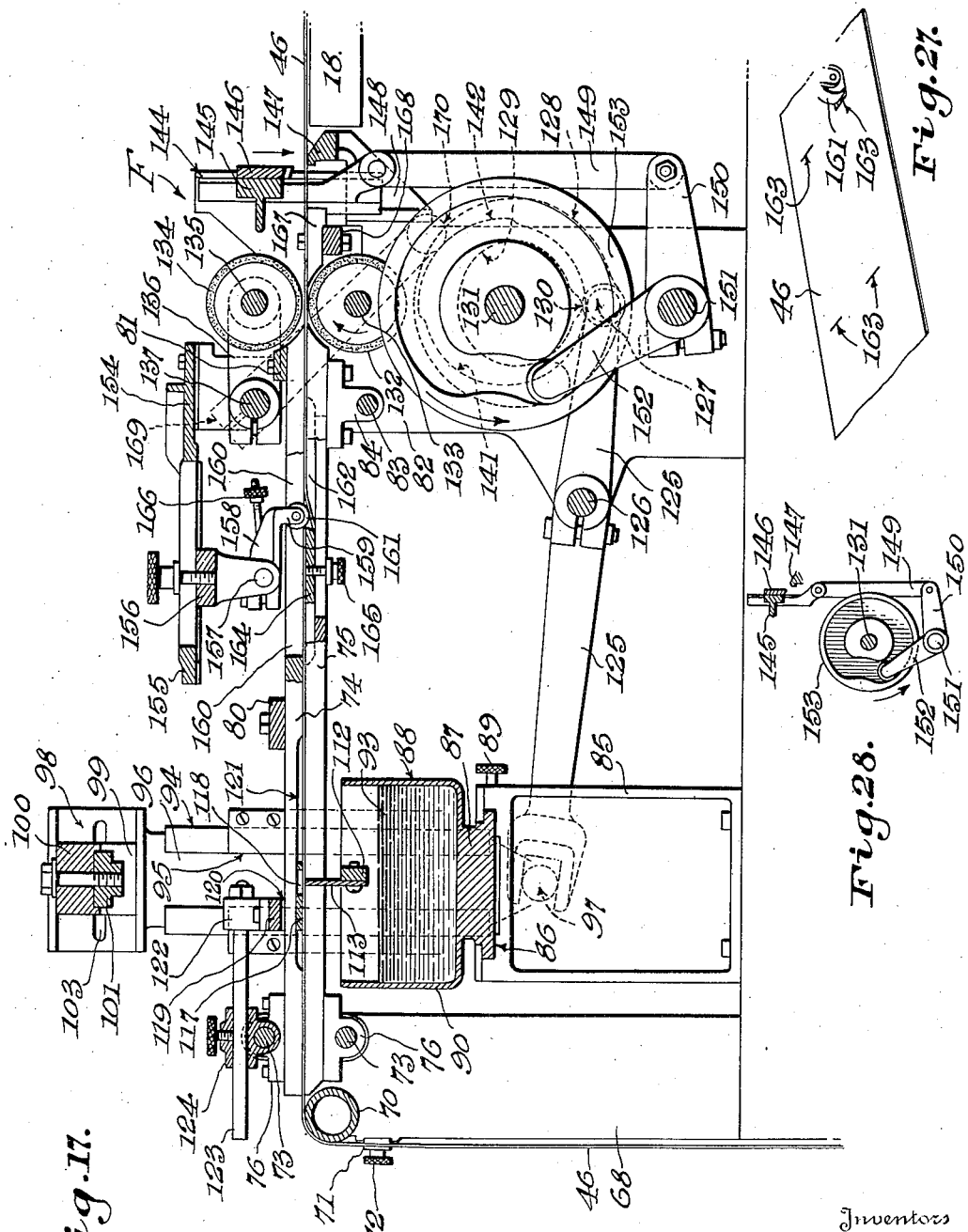
Inventors
S. A. Harris
T. H. Nifong
R. T. Stewart
By Baldwin & Wight
Their Attorneys

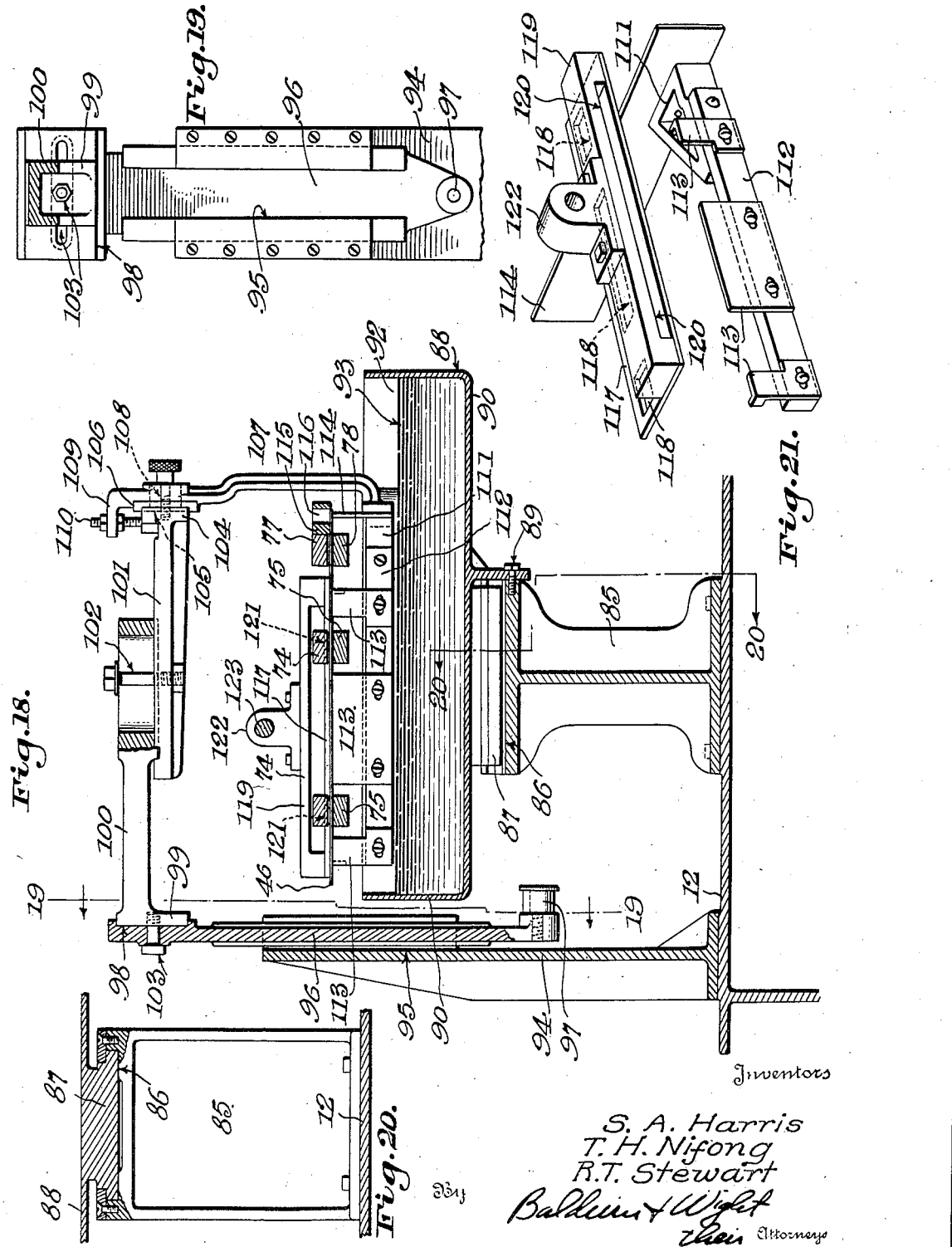

Dec. 30, 1941.    S. A. HARRIS ET AL    2,268,283
BAG OR BOX MAKING MACHINE
Filed July 5, 1939    15 Sheets-Sheet 11
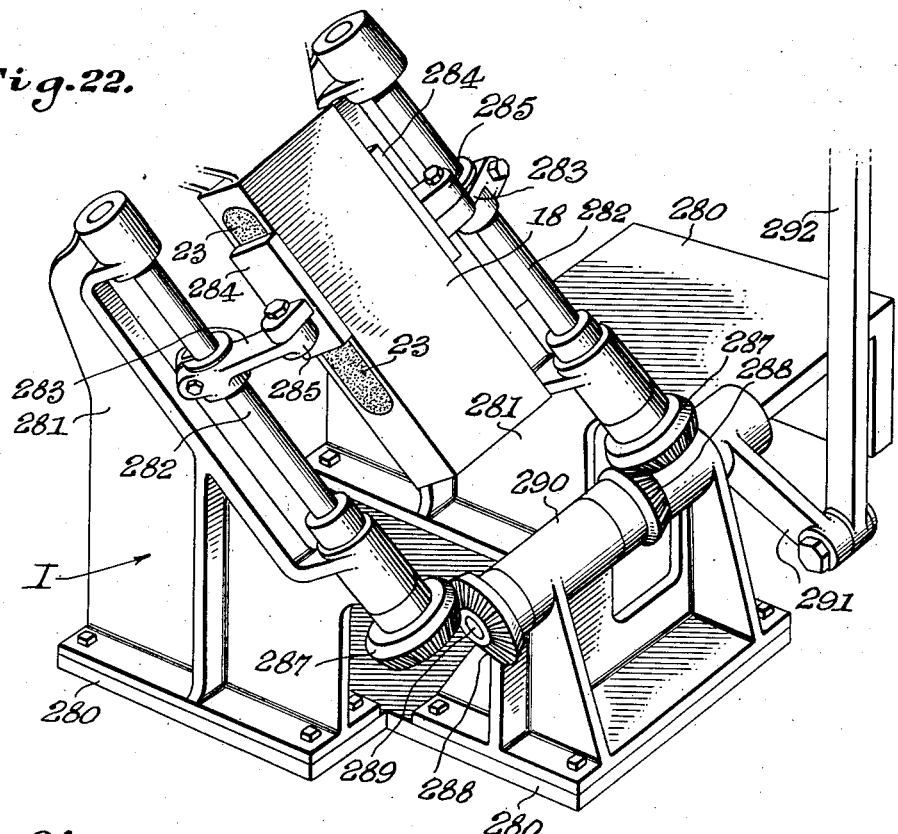
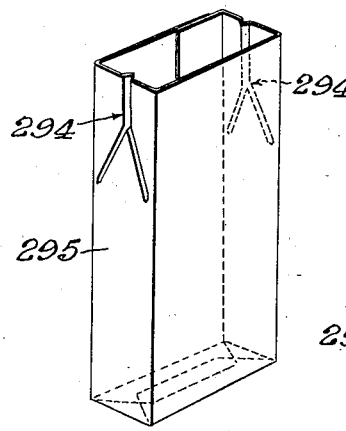
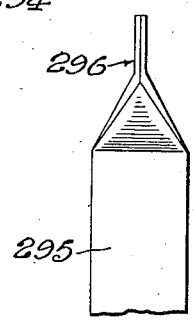
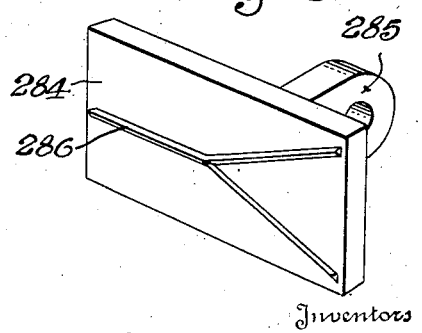
Inventors
S. A. Harris
T. H. Nifong
R. T. Stewart
By Baldwin & Wight
their Attorneys Dec. 30, 1941.   S. A. HARRIS ET AL   2,268,283
BAG OR BOX MAKING MACHINE
Filed July 5, 1939   15 Sheets-Sheet 12
*Fig.29.*
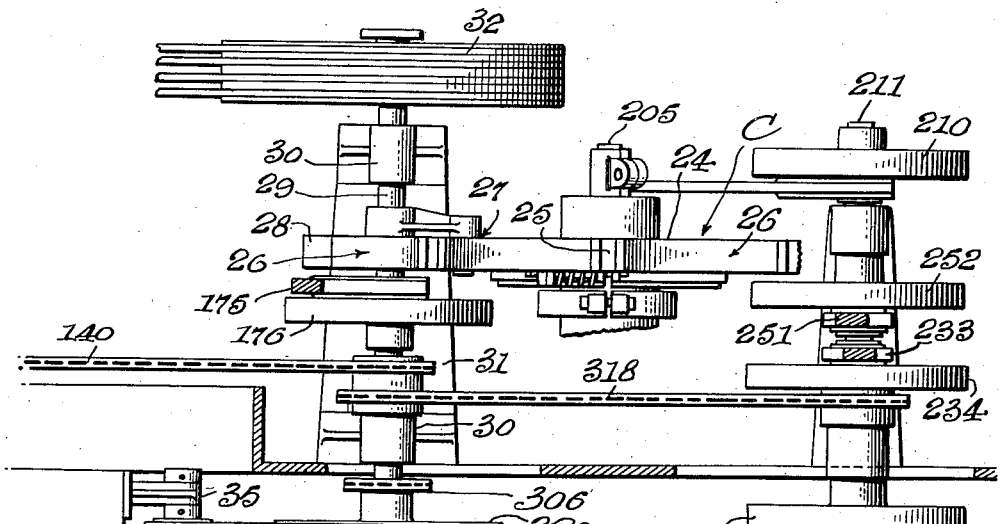
*Fig.30.*
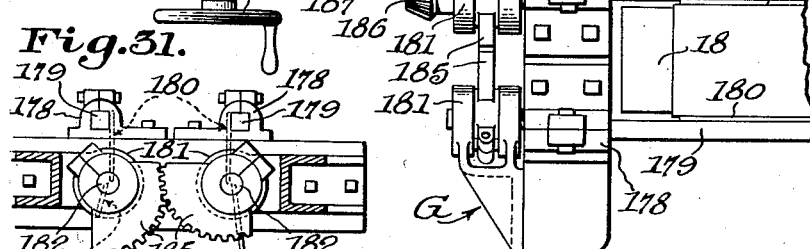
*Fig.31.*
*Fig.32.*   *Fig.33.*
Inventors
S.A. Harris
T.H. Nifong
R.T. Stewart
Attorneys

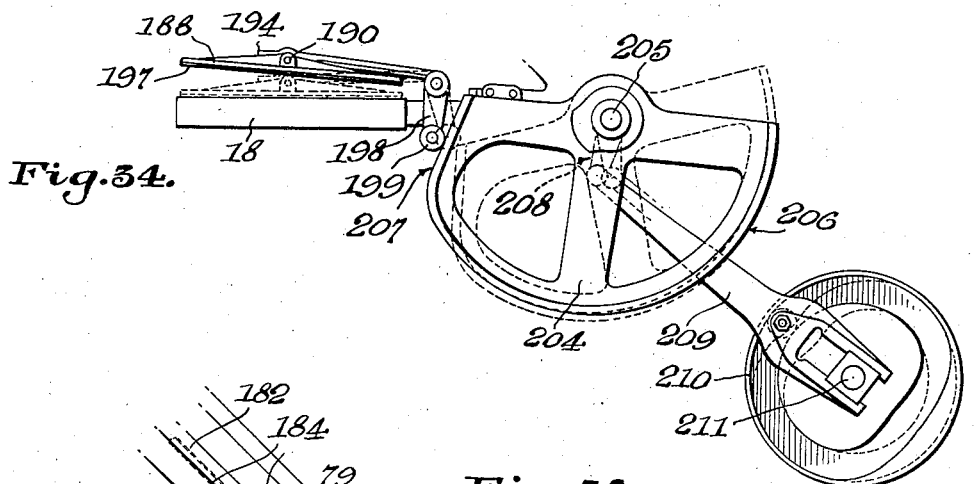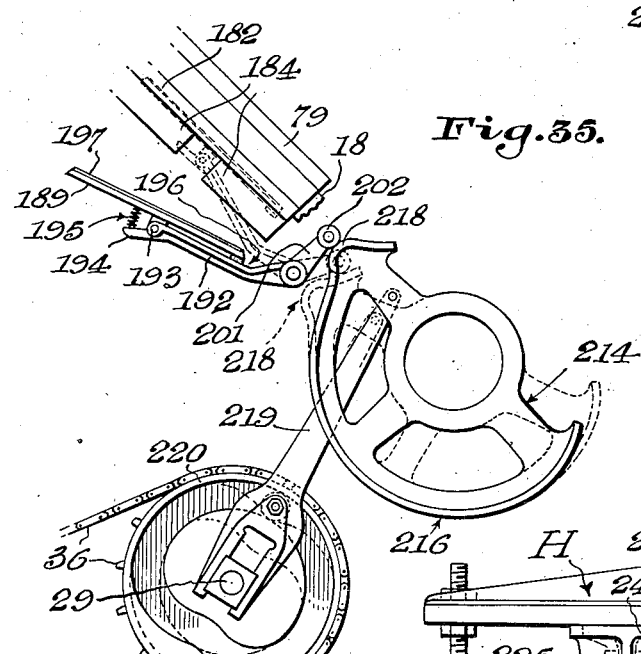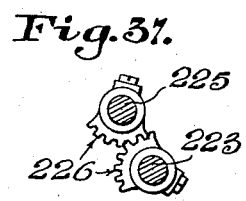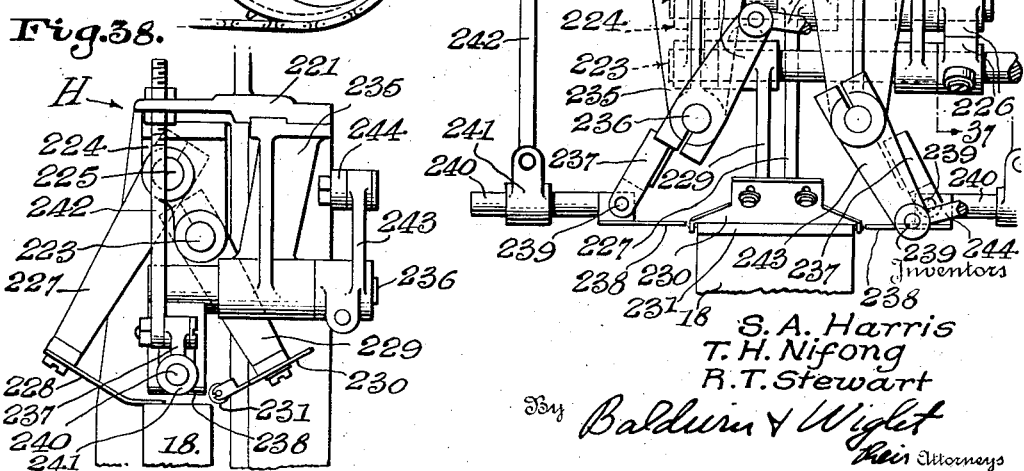

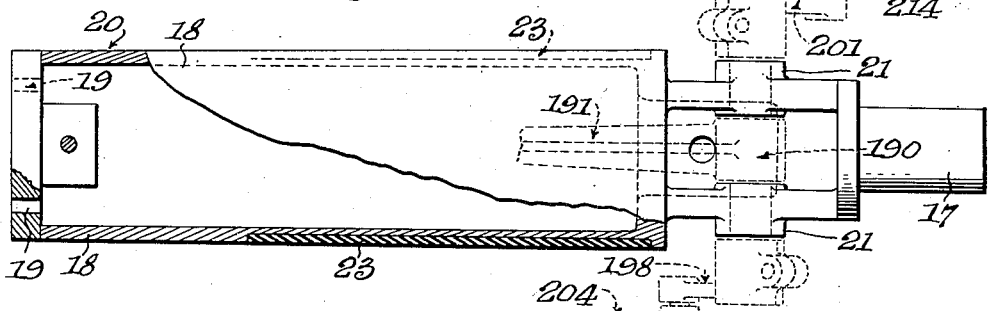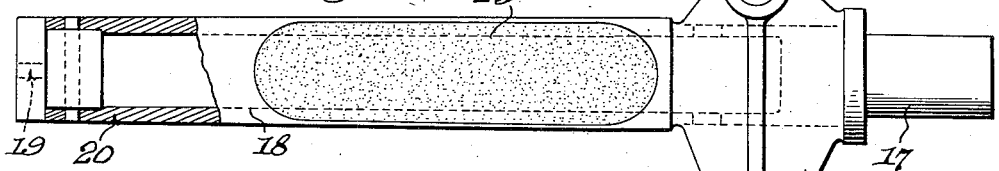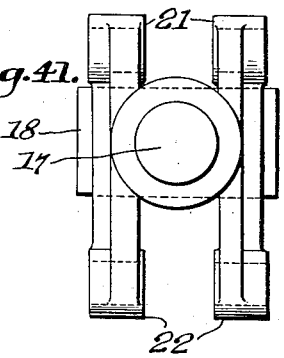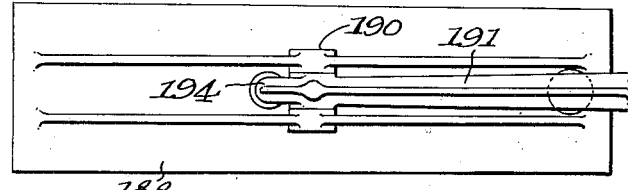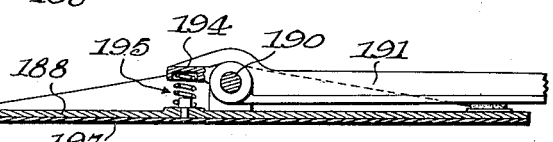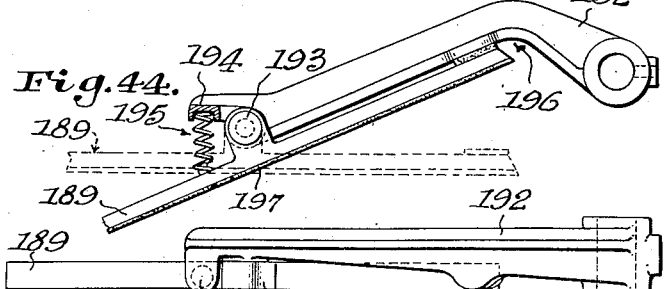

Dec. 30, 1941.  S. A. HARRIS ET AL  2,268,283
BAG OR BOX MAKING MACHINE
Filed July 5, 1939    15 Sheets-Sheet 15
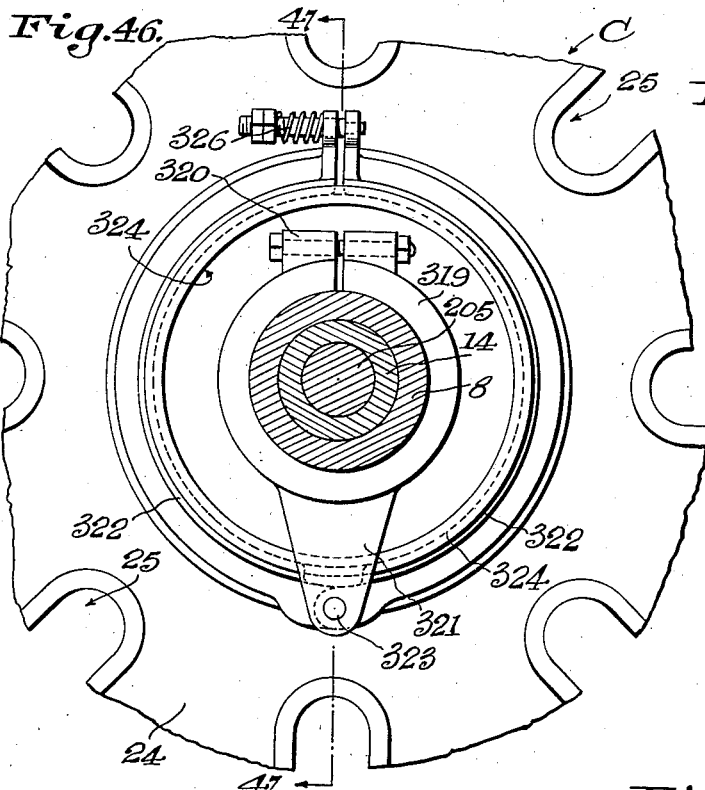
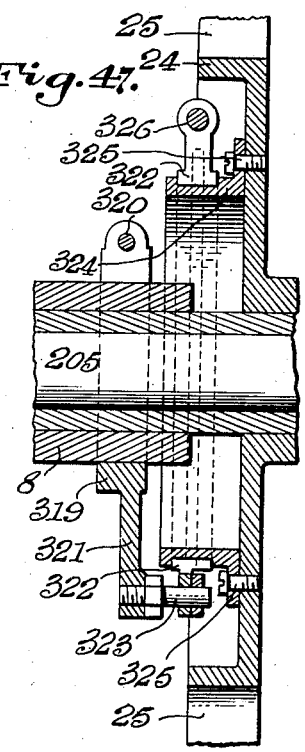
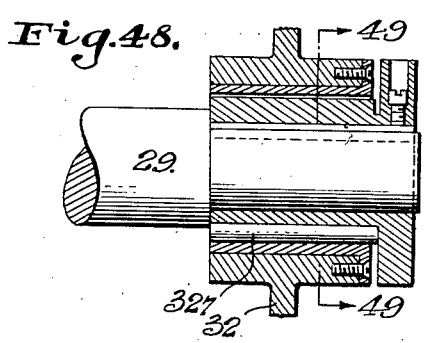
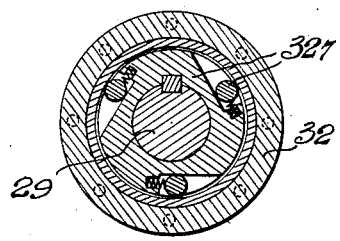
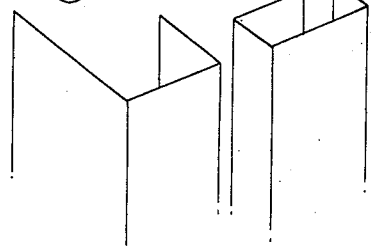
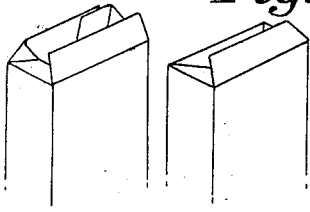
Inventors
S. A. Harris
T. H. Nifong
R. T. Stewart
Baldwin & Wight
their Attorneys Patented Dec. 30, 1941

2,268,283

UNITED STATES PATENT OFFICE 2,268,283

BAG OR BOX MAKING MACHINE

Samuel A. Harris, Thomas H. Nifong, and Ralph T. Stewart, Winston-Salem, N. C., assignors to Briggs-Shaffner Company, Winston-Salem, N. C., a corporation of North Carolina Application July 5, 1939, Serial No. 282,920

42 Claims. (Cl. 93—12)

The invention relates generally to bag or box making machinery of the turret mandrel carrier type and primarily seeks to provide a novel machine structure embodying means for feeding a web of material, preferably heavy foil, means for severing uniform blank lengths from the web, and means for forming the blank lengths into bags or cup-like structures open at the top and closed at the bottom and sides.

An object of the invention is to provide a machine of the character stated which includes a novel turret structure in which is embodied a plurality of mandrels disposed radially and in equidistantly spaced relation, and means for indexing the turret about a horizontal axis to present the mandrels at successive stations at which the various folding operations necessary in the formation of the bags or cups are performed.

Another object of the invention is to provide a novel web feeding and cutting mechanism including a novel blank length registering means for assuring the severance of the blank lengths at predetermined points.

Another object of the invention is to provide novel means for applying a suitable adhesive to the portions of the web or blank sections intended to engage in the formed bag or cup in a manner for avoiding gumming of machine parts and yet for assuring secure adhesion of said portions.

Another object of the invention is to provide novel body clamp equipment for clamping the blanks or bag body portions to the mandrels during formation of the bags, and novel means for actuating said clamps.

Another object of the invention is to provide a novel first or side fold mechanism positioned at one station to which the mandrels are moved and which includes a pair of folder wings normally spaced in parallel relation and effective to start the first folding operation by side contact as the mandrel and the blank clamped thereto move between the stationary wings, and means effective to swing the wings about individual axes to complete the first folding operation after the mandrel comes to rest, with one wing moving more rapidly than the other to prevent interference.

Another object of the invention is to provide novel seam clamp equipment effective to hold the seam or overlap formed during the first folding operation, and novel means for actuating said clamps.

Another object of the invention is to provide novel second or bottom fold mechanism for closing the bottom of the bags or cup-like containers, and novel means for actuating said mechanism.

Another object of the invention is to provide novel bottom pressing mechanisms.

Another object of the invention is to provide novel seam setting means.

Another object of the invention is to provide novel means for Y-creasing the bag sides adjacent the open mouths thereof so as to facilitate subsequent closing.

Another object of the invention is to provide novel means for stripping the formed bags or cup-like containers from the mandrels on which they were formed.

With these and other objects in view which will more fully appear, the nature of the invention will be more clearly understood by following the description, the appended claims, and the several views illustrated in the accompanying drawings.

In the drawings:

Figure 5 is a fragmentary front elevation illustrating the seam and bottom fold setting roller and plate equipments and actuating devices therefor.

Figure 6 is a right side elevation of the parts shown in Figure 5.

Figures 7 and 8 are front and inverted plan views illustrating the stationary bottom fold pressing roller mounting bracket.

Figure 9 is a detail vertical cross section illustrating the mounting of one of the setting rollers on said bracket.

Figure 10 is a rear elevation of the foil supply roll mounting unit.

Figure 11 is a front elevation of said unit.

Figure 12 is a plan view of said unit.

Figure 13 is a vertical longitudinal section through the axis of the foil web supply roll.

Figure 14 is a plan view illustrating the web feeding, cutting and pasting unit.

Figure 15 is a right hand elevation of the unit shown in Figure 14.

Figure 16 is a rear elevation of a portion of the unit shown in Figure 14 and illustrating the feeding roller drive connections.

Figure 17 is a central vertical longitudinal section taken through the unit illustrated in Figure 14.

Figure 18 is a vertical cross section taken substantially on the line 18—18 on Figure 14.

Figure 19 is a fragmentary vertical section taken on the line 19—19 on Figure 18.

Figure 20 is a fragmentary vertical section taken on the line 20—20 on Figure 18.

Figure 21 is a perspective view illustrating the paste applying blade equipments and the plate which supports the foil web against the upward thrust of the transverse blade equipments.

Figure 22 is a detail perspective view illustrating the unit for Y-creasing the formed bags.

Figure 23 is a detail perspective view of one of the Y-creasing plates.

Figure 24 is a detail perspective view illustrating a finished bag.

Figure 25 is a fragmentary edge view illustrating how the Y-creasing facilitates flat closing of the bag mouth.

Figure 26 is a detail view illustrating a foil blank, the lines of fold being indicated thereon by dot and dash lines.

Figure 27 is a fragmentary perspective view of a portion of the foil web illustrating the slits therein defining the blank lengths.

Figure 28 is a fragmentary vertical cross section illustrating the knife actuating cam.

Figure 29 is a somewhat diagrammatic horizontal section illustrating the drive connections of the cam shafts.

Figure 30 is a fragmentary right side elevation illustrating the first fold unit actuating connections.

Figure 31 is a fragmentary horizontal section illustrating the relation of the eccentric actuator gears of the first fold unit.

Figures 32 and 33 are fragmentary horizontal sections illustrating successive steps of the first folding operation.

Figure 34 is a somewhat diagrammatic front elevation illustrating the operation of the body clamp controlling cam.

Figure 35 is a somewhat diagrammatic front elevation illustrating the operation of the seam clamp controlling cam.

Figure 36 is a fragmentary right side elevation illustrating the bottom folding mechanism.

Figure 37 is a detail vertical cross section taken on the line 37—37 on Figure 36.

Figure 38 is a front elevation of the parts illustrated in Figure 36.

Figure 39 is a plan view and part horizontal section of one of the form or mandrel units.

Figure 40 is an edge view of the unit shown in Figure 39, parts being in longitudinal section.

Figure 41 is a right hand elevation of the unit shown in Figure 40.

Figure 42 is a plan view of one of the body clamps.

Figure 43 is a central longitudinal section of the clamp shown in Figure 42.

Figure 44 is a detail rear elevation illustrating one of the seam clamps.

Figure 45 is a plan view of the clamp shown in Figure 44.

Figure 46 is a detail vertical cross section illustrating the Geneva brake.

Figure 47 is a vertical longitudinal section taken on the line 47—47 on Figure 46.

Figure 48 is a fragmentary longitudinal section taken through the cam shaft driving pulley.

Figure 49 is a detail vertical cross section taken on the line 49—49 on Figure 48.

Figures 50, 51, 52, 53 and 54 are fragmentary perspective views illustrating the successive folds made in the formation of the bag or cup.

Figure 55 is a fragmentary horizontal section illustrating the function of the completed bag stripping rollers.

Figure 1:
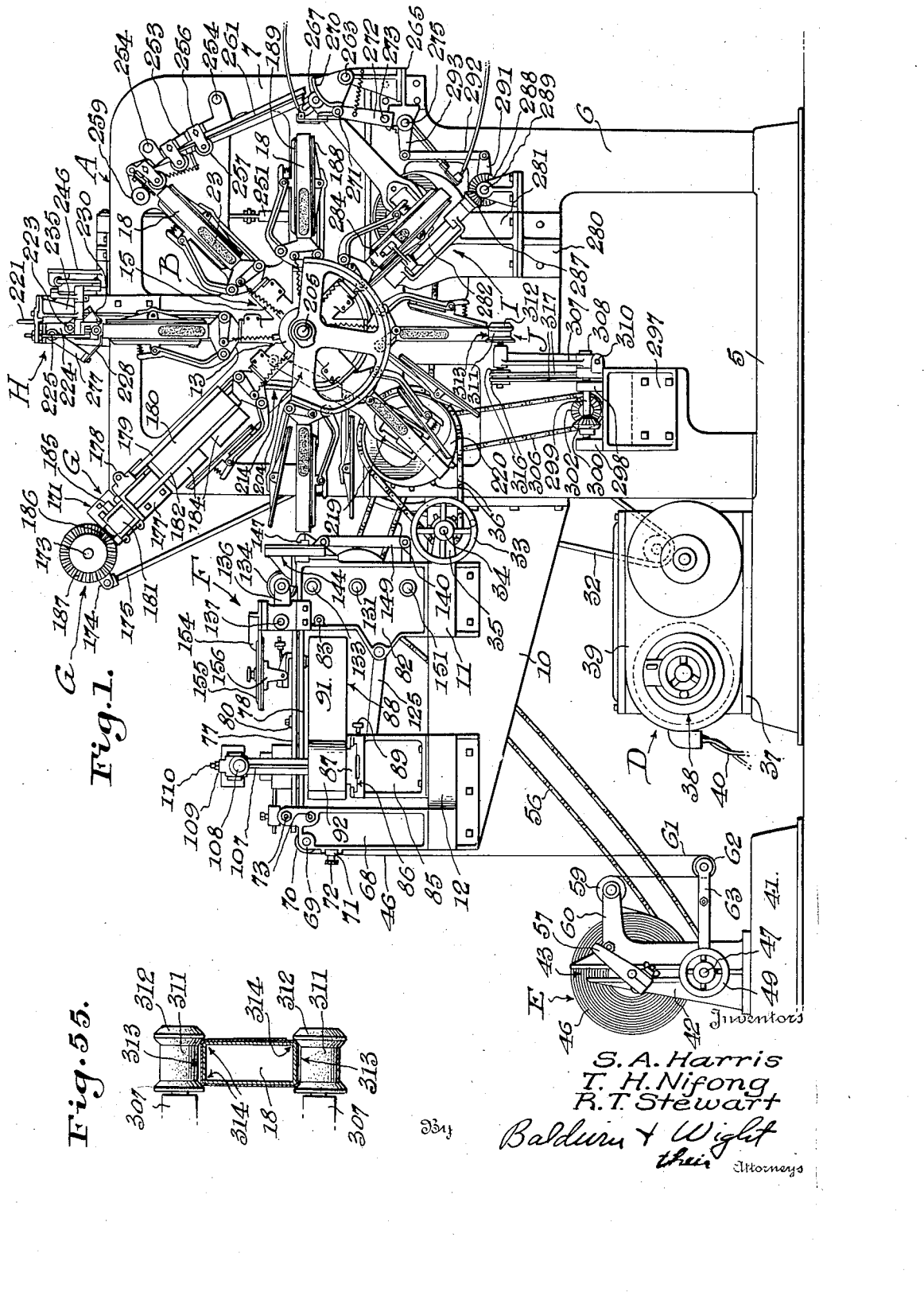
Figure 1 is a front elevation of a machine embodying the invention.

The machine illustrated in the accompanying drawings as an example of embodiment of the invention, comprises a frame structure generally designated A, a mandrel or form carrying turret B, suitable Geneva gearing C for indexing the turret station to station and presenting the forms to the various folding and other operating devices, a power unit D, a foil web supply unit generally designated E, a foil web feeding, cutting and pasting unit generally designated F which presents pasted blanks one by one to the turret mandrel presented at the receiving station, a first or side fold unit G, a second or bottom fold unit H, a Y-creasing unit I, and a finished bag stripping unit J.

The frame A

The frame A comprises a base 5, a lower body portion 6 supported on the base, and an upper body portion 7 secured upon the portion 6. A hub bearing 8 is flange-secured as at 9 on the upper body portion 7 and provides the main bearing support for the turret B. The frame structure also includes a main web cutting and pasting mechanism supporting bracket 10 secured to and projecting longitudinally from the bottom frame portion 6, and which in turn serves as a support for a cutting mechanism supporting bracket 11 and a paste pot supporting bracket 12 both of which project forwardly in right angular relation to the bracket 10. See Figures 1, 3, 4 and 17 of the drawings.

The turret B

Figure 4:
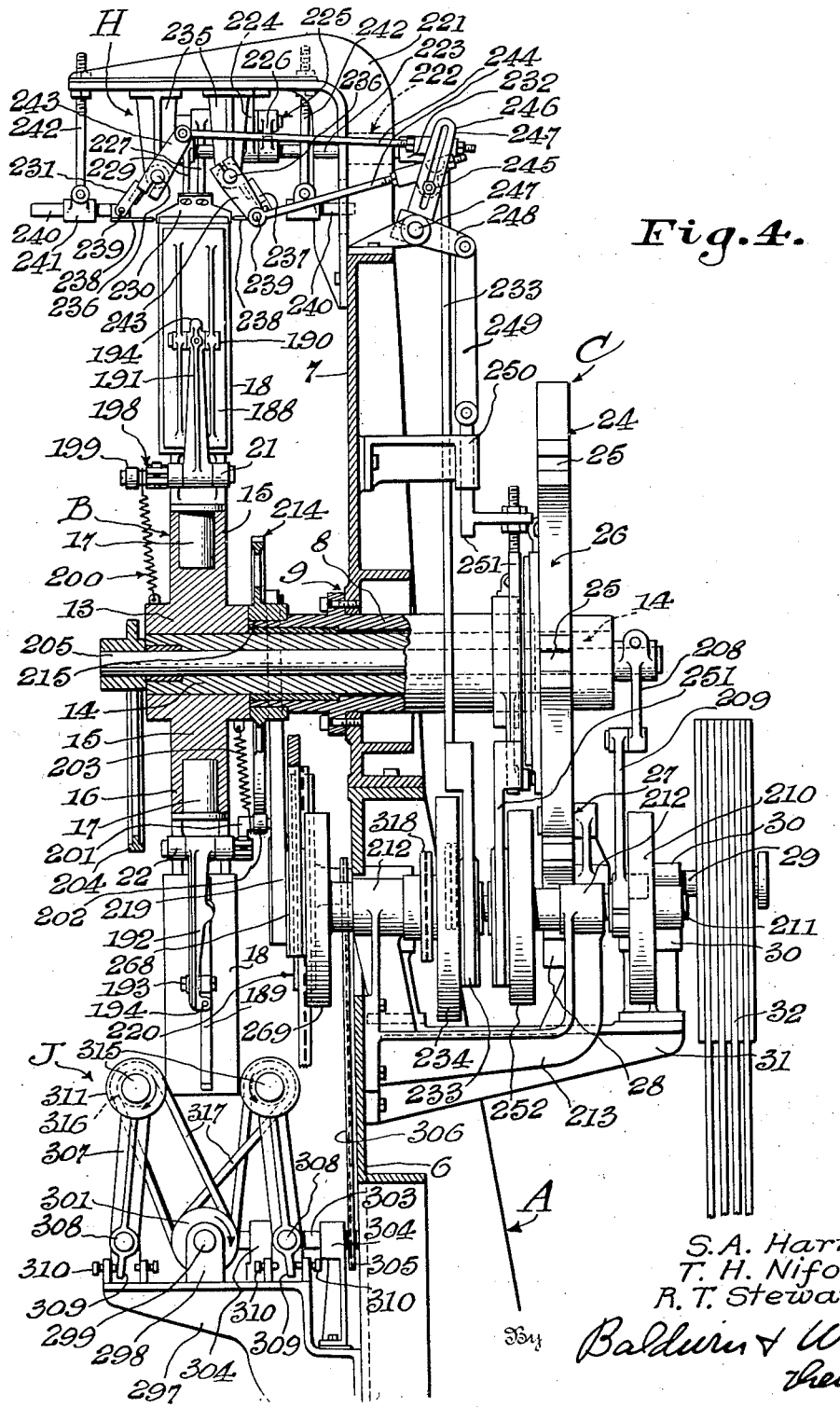
Figure 4 is an enlarged vertical cross section taken in part through the axis of the mandrel carrying turret.

The mandrel supporting turret includes a hub portion 13 which is secured on a sleeve 14 rotatably mounted in the framing hub bearing 8 in the manner illustrated in Figure 4. The machine herein disclosed is an eight station machine and the turret hub is equipped with eight radially disposed, equidistantly spaced mounting arms 15 each presenting a split socket clamp bearing 16 for receiving and securing the mounting shanks 17 projecting inwardly from the radially disposed hollow, box-like mandrels or forms 18. Each hollow mandrel is apertured as at 19 to break suction and facilitate removal of the completed bags from the form or mandrel, and is slightly tapered as at 20 to further facilitate such stripping. See Figures 1, 39, 40 and 41. Each mandrel or form unit also includes a pair of spaced forwardly directed mounting ears 21 and a similar pair of spaced rearwardly directed mounting ears 22, and each front and rear edge wall of each form or mandrel unit is equipped with a soft rubber wall insert 23, the purpose of which will later become apparent.

The Geneva drive equipment C

The Geneva driving equipment includes a Geneva wheel 24 which is secured on the turret sleeve 14 and equipped with eight radial slots 25, one for each station to which the turret is to be indexed to serially present the forms or mandrels 18 carried thereon. The Geneva wheel also includes the usual peripheral locking recesses 26. Indexing movement is imparted to the wheel in the usual manner by a driving roller 27 engageable in the radial slots 25, and the usual Geneva lock 28 cooperates with the peripheral recesses 26 to secure the wheel between station to station movements thereof, and these driving roller and lock equipments 27 and 28 are carried by a driver cam shaft 29 rotatably supported in bearings 30 mounted on a bracket 31 secured to the lower frame body 6. Rotation is imparted to the driver cam shaft 29 by suitable belt and pulley equipment 32 from the drive unit D. See Figures 3, 4 and 29.

The shaft 29 and the turret structure can also be rotated by hand through the medium of a hand wheel 33 secured on a shaft 34 rotatable in bearings 35 supported on the bracket 11 and which is longitudinally shiftable to effect engagement or disengagement of a suitable clutch head with sprocket and chain drive connections 36 with the shaft 29.

Power unit D

The power unit D includes a mounting casing 37, a drive motor 38 and any suitable speed change gearing 39 so that the speed at the power output sprocket forming a part of the drive connections generally designated 32 can be varied at will. The motor is supplied with power through suitable conductor lines 40. See Figures 1 and 3.

Foil web supply unit E

The foil web supply unit E includes a mounting base 41 upon which is supported a pair of spaced frame standards 42 having vertical slots 43 therein for slidably receiving the trunnions 44 of the foil supply spool 45 which carries the supply foil web 46.

The supply roll rests upon a roller 47 rotatably supported as at 48 in the standards 42. The trunnions of the roller 47 extend beyond their bearings and one is equipped with a hand wheel 49 and the other with a brake pulley 50 which is recessed to receive a friction disc 51 opposed by a drive plate 52 constantly urged against the friction disc by a spring 53 interposed between the plate and an abutment collar 54 secured on the trunnion extension outwardly of said plate. The plate includes a drive sprocket 55 to which rotation is imparted through suitable chain and sprocket connections 56 with driving parts to be described hereinafter. By reason of the provision of the friction disc and plate equipments 51, 52, the roller 47 normally rotates with the sprocket 55, but these parts are permitted to move relatively upon imposition of overloads.

A brake or drag arm 57 grips one trunnion 44 of the spool 45, and the free end of this arm engages a pin 58 stationarily supported upon the adjacent frame standard 42. The arm 57, held against movement by the pin 58, and frictionally gripping the trunnion 44, constantly deters rotation of the spool 45 and serves to keep the peripheral layers of the web tight on the supply roll.

An idler roll 59 is supported in suitable extensions 60 of the frame standards 42, and the foil web 46 extends from the upper portion of the supply roll over the idler roller 59 and downwardly therefrom, and thence upwardly in the manner illustrated in Figures 10 and 11 of the drawings, to form a loop 61. A web retracting and registering idler roll 62 rests in the loop 61 and is supported at the free ends of bail arms 63 pivoted as at 64 to the trunnions of the supply supporting roller 47. One of the arms 63 has one end of a brake band 65 secured thereto as at 66, said brake band being passed over the brake pulley 50 and secured as at 67 to the adjacent frame standard 42. Thus gravity action on the arms 63 and idler roller 62 constantly tends to apply the brake 65 to the drum 50 and supporting roller 47. See Figures 10 to 13.

The foil feeding, cutting and pasting unit F

This unit is best illustrated in Figures 3, and 14 through 21 of the drawings. A pair of bearing standards 68 is mounted upon the left end portion of the rack 12 and provides trunnion bearing as at 69 for an idler roller 70 over which the upwardly extending portion of the foil web 46 passes in the manner illustrated in Figures 1 and 17. Adjacent the roller 70 the edges of the web 46 pass through slotted guide fingers 71 laterally-adjustably mounted on the standards 68 by slot and screw equipments 72. These guides serve to straighten out edge portions of the web that tend to curl and definitely position the web with relation to the roller 47.

The standards 68 also support upper and lower cross rods 73. The upper rod 73 supports an upper pair of longitudinal bars 74 bearing parallel spaced relation, and the lower rod supports a pair of similar lower bars 75, said upper and lower sets of bars being spaced to receive and guide the traveling web between them. The bars are supported on the rod by suitable mounting brackets 76. See Figures 14, 17 and 18.

Adjacent the foremost edge of the web another set of upper and lower cooperating guide bars or rails 77 and 78 are mounted, being supported by suitable brackets 79 on the rods 73.

All of the upper rails 74 and 77 may be bridged by a cross rail 80 if desired, and at their delivery ends said rails or bars are secured to a suitable supporting bar 81 secured to a pair of opposed cutting and feeding mechanism frame standards 82 mounted on the frame bracket 11 hereinbefore referred to. The lower rails or bars 75 and 78 are supported through the medium of mounting brackets 84 on a cross rod 83 mounted on the frame standards 82.

A paste pot supporting bracket 85 is mounted on the frame bracket 12 and is equipped with a slide grooveway 86 at its upper end for slidably receiving the mounting slide 87 depending from the paste pot 88. The slide 87 may be secured in the slideway by suitable securing screw equipments 89. The paste pot 88 is generally L-shaped in plan, as shown in Figure 14, and includes a transverse well portion 90, a longitudinal well portion 91, and a filling extension 92. The paste supply is illustrated at 93.

A slide standard 94 is supported upon the frame bracket 12 and includes a slideway 95 for vertically, slidably receiving the paste applicator slide 96 having a roller 97 projecting forwardly from its lower end and equipped at its upper end with a cross groove 98 in which a mounting head 99 is longitudinally, adjustably mounted. The head 99 includes an applicator supporting cross arm formed in two pieces 100 and 101 longitudinally, adjustably joined by slot and screw equipment 102, and the head 99 is adjustably secured in the cross groove 98 through the medium of a slot and screw equipment 103. See Figures 14, 17, 18 and 19.

The member 101 carries a mounting head 104 at its forward extremity which includes a vertical grooveway 105 for receiving the head portion 106 of an applicator blade carrier 107 which is vertically adjustable in the grooveway 105 through the medium of the slot and screw equipment 108, and includes an overhanging finger 109 equipped with an adjustable stop screw 110 engageable with the head 104 for determining the vertical positioning of the arm 107. See Figure 18.

At its lower end the arm 107 carries an angled bracket 111 to which is secured a transverse bar 112 adjustably supporting a plurality of upstanding applicator blades 113 suitably spaced to avoid gumming of the trackways by contact of pasted web portions, and a longitudinal applicator blade 114. See Figures 14, 18 and 21.

A bar 115 is secured along the front edge of the upper rail 77 and is slotted as at 116 to cooperate with the longitudinal applicator blade 114 by supporting the foil web against the upward, paste applying thrust of said blade. A plate member 117 suitably apertured as at 118 similarly overlies the transverse applicator blades 113 for cooperating therewith in the manner referred to in connection with the blade 114, said plate 117 being supported on a cross bar 119 having a cutout 120 for straddling the rails 74, said rails likewise being cutout as at 121 to accommodate positioning and movement of the plate 117. The bar 119 is supported by a suitable bracket 122 at the free end of a mounting rod 123 adjustably slidable in a bracket 124 mounted on the upper rod 73. By reason of the provision of this equipment the cross bar 119 can be moved longitudinally of the unit F to compensate for blank length changes and for properly registering with the similarly adjustable applicator blade equipments. See Figures 14, 17, 18 and 21.

The slide 96 is vertically reciprocated for alternately picking up paste 93 from the pot 88 and applying it to the web 46, by a socketed lever 125 pivoted intermediate its ends as at 126 on a cross shaft supported in the bearing standards 82. The socketed end of the lever receives the roller 97 of the slide, and at its opposite end said lever carries a roller 127 which rides in a groove in a plate cam 128, said groove including a partial lift portion 129 and a final lift portion 130 effective to lift the blade equipments to the paste applying position in two stages whereby the blades will pause prior to contact with the web and allow a draining off of surplus paste, and then move the remaining distance necessary to apply just the proper amount of paste to said web. The cam 128 is mounted on a shaft 131 rotatable in suitable bearings provided in the frame standards 82. See Figures 15 and 17.

The foil web 46, guided by the upper and lower rail sets 74, 77 and 75, 78, passes over three lower rubber-rimmed feed rollers 132 which are constantly rotated and supported on a shaft 133 rotatable in the frame standards 82. The stationary rollers 132 are opposed by upper, continuously rotating movable rollers 134 carried on a shaft 135 mounted in the free ends of a pair of lifter or crank arms 136 secured on a cross shaft 137 rockably mounted in the standards 82. The shafts 133 and 135 carry constantly meshing gears 138, the teeth of which are long enough to permit separation of the opposed rollers 132 and 134, effected by upward swinging movement of the arms 136, without disturbing the constant rotation of said rollers.

The lowermost one of the gears 138 is driven by a gear 139 fixed upon the cam shaft 131 to which rotation is imparted through sprocket and chain connections 140 with the driver cam shaft 29 hereinbefore referred to. The shaft 131 also imparts movement to the power transmitting connections 56 and to the foil web supply supporting roller 47 with which they connect.

It will be noted by reference to Figures 3, 14, 15 and 16 of the drawings that the shaft 131 also carries a disc cam assembly 141 composed of two plates including dwell portions 142 and relatively adjustable about their axes, through the medium of slot and screw connections 143, for adjusting the effective length of cam dwell portion 142 compositely presented by said plates. The purpose of this plate cam structure will become apparent as the description progresses.

The bearing standards 82 also include vertical slideways 144 for slidably receiving a knife slide 145 to which a knife bar 146 is removably secured. The knife bar is cooperatively engageable with a ledger blade 147 removably supported on brackets 148 secured to the standards 82. The slide 145 is link-connected as at 149 with a pair of cranks 150 secured upon a shaft 151 rockably mounted in the standards 82. Rocking motion is imparted to the shaft 151 by a crank arm 152 secured thereon and having a roller engaged in a suitable face groove in a knife operating cam 153 secured upon the shaft 131 hereinbefore referred to. It will be obvious that as the shaft 131 is rotated, its rotary motion will be transmitted through the cam 153, cranks 152, 150 and links 149 in the form of vertical reciprocatory motion to the slide 145.

A bracket 154 is secured across the tops of and braces the frame brackets 82, and this bracket 154 includes a longitudinally extended and slotted portion 155 on which a head 156 is adjustably mounted. See Figures 14 and 17. The head 156 rockably supports a shaft 157 which extends fore and aft of the head and has an arm 158 secured to each end thereof. The arms 158 are centered over the rails 74 and each includes a depending bifurcated bearing 159 movable in a slotway 160 formed in the respective rail 74 and which carries a roller 161 adapted to ride on the foil web passing between the upper and lower rails 74 and 75. The rollers 161 are engageable with the foil web directly over longitudinal clearances 162 formed in the upper surface of the lower rails 75, as shown in Figures 14 and 17 of the drawings.

It will be noted by reference to Figure 27 of the drawings that the web 46 is provided at equidistantly spaced intervals marking blank lengths with pairs of laterally aligned slits 163. These slits form a part of a blank registering equipment forming a feature of the invention and by provision of which severance of the blanks from the web at the positions of the slits and in a manner for properly displaying artistic dressing included on the blanks is assured.

As the web passes over the rails 75 the rollers 161 engaging the webs at the positions of the slits 163 depress lip portions of the web into the grooveways 162 for engagement with blank registering abutment plates 164 adjustably positioned in the grooveways through the medium of slot and screw equipments 165. The amount of pressure to be exerted by the rollers for web lip depressing purposes can be adjusted through the medium of the counterweight equipment 166 mounted on each arm 158.

Short web supporting and guiding rails 167 are mounted just beyond the lower feed rollers 132 on a cross bar 168 supported on the brackets 82.

A crank arm 169 is secured upon the shaft 137 and has a roller 170 at the free end thereof adapted to ride on the peripheral edges of the plate cam 141 to be alternately lifted and lowered for alternately lifting and lowering the feed rollers 134 out of driving engagement with the web by the adjustable dwell portions 142 of said cam equipment. It will be readily understood that although the opposed web feed rollers 132, 134 are constantly rotated they will feed the web only when the upper rollers 134 engage the web in opposition to the lower rollers 132. Whenever the upper feed rollers 134 are lifted slightly off the web, feeding of the web is discontinued despite the fact that continuous rotation of the upper and lower rollers is not disturbed.

The constantly rotating upper and lower sets of feed rollers 134, 132 grip the foil web 46 between them and feed it toward the turret, drawing the web over the idler rollers 70, 62 and 59 and being aided somewhat by the sprocket and chain driven slip clutch equipped supporting roller 47. As has been hereinbefore mentioned, the foil web is tensioned by the brake lever 57, and the web loop engaging, bail arm carried roller 62 performs the twofold function of tending to draw the web back from the feeding rollers and to apply the brake 65 to grip the drum 50 each time a sufficient amount of foil web has been fed from the supply roll to keep step with the feeding movement imparted by the sets of rollers 134, 132.

The adjustable blank registering abutment plates 164 are placed so that the abutment edges thereof are spaced from the cutting plane of the knife elements 146, 147 the exact length of a blank, or, in other words, the distance between blank defining, spaced sets of transverse web slits 163. The transverse paste applying blade equipments 113 are spaced from the abutment edges of the plates 164 just short of the length of a blank so as to properly position the applied paste spots closely adjacent but inwardly of the trailing extremity of a blank to be formed. By suitable adjustment of the positions of the abutment plates 164, lip depressing rollers 161 and the paste applying devices 113, the machine can be adapted for the cutting of blanks of various lengths. The parts are so timed that the feed rollers 134, 132 feed a length of web so that the advance portion thereof extends beyond the cutting plane of the blades 146, 147 a distance very slightly in excess of the length of a blank, or, in other words, a set of transverse slits in the web is fed just beyond the cutting plane. At this instant the roller 170 carried by the actuating crank 169 is engaged by the adjusted plate cam dwell portion 142 and the crank arms 136 are swung upwardly a distance sufficient to disengage the upper set of feed rollers 134 from the web 46. This upward movement of the rollers is sufficient to discontinue feed gripping of the web but is insufficient to separate the gears 138 and discontinue rotation of the upper rollers 134. As soon as the upper rollers 134 are removed from gripping engagement with the web 46, the web is drawn backwardly the slight distance necessary to permit the lips depressed by the rollers 161 to engage the web registering abutment edges of the plates 164, and at the instant this registry occurs the knife 146 descends and properly severs the blank extended beyond the ledger blade and overlying the turret form or mandrel 18 at rest at the blank receiving station, as indicated in Figure 17 of the drawings. The parts are also timed so that each time a blank is registered in the manner stated and during an interval of rest of the web with the blank in the registered position, the paste applicator blade equipments 113, 114 are moved upwardly to suitably apply paste to the under surface of a blank portion later to be cut. As has been previously explained, the movement of the blade equipments toward the web is made in two steps, a rest interval serving to drain off surplus paste preceding the final movement of the equipments into contact with the web so as to avoid excessive paste applications. It will be observed by reference to Figure 17 that the blank being cut is positioned over the receiving form or mandrel 18, the next blank portion to be registered and cut is disposed between the roller sets 134, 132, and a succeeding blank portion to be cut is positioned for receiving paste. It will be understood that suitable adjustment of the feed controlling cam equipments 141, 142, 143 are made to compensate for any adjustments of the abutment plate 164, rollers 161, and paste applying blade equipments 113, 114 so as to attain the desired feeding and registering cooperation of these parts.

*The first or side fold unit G*

As has been hereinbefore stated, the eight forms or mandrels 18 carried by the turret are serially presented at eight successive stations. Station #1, the receiving station at which the foil blanks are received by the forms or mandrels, is a horizontal station, and when at this station each form or mandrel is so positioned that the upper or advance surface thereof is on a level with the cutting edge of the ledger blade 147 and forms a supporting shelf for the blank severed by the blades 146, 147. At station #2, whereat the mandrel is positioned at an angle of 45°, the side folding of the blank about the form or mandrel is effected. At station #3, a vertical station, the bottom of the bag is formed about the end or outer extremity of the form or mandrel, and at station #4 the bottom folds are given a roll press and the side seam formed by the first or side folding which takes place at station #2 is set by rolling contact of an arm carried roller to be described in detail hereinafter. As the respective mandrels pass from station #4 to station #5, another horizontal station, the bottom folds are given additional rolling pressure by stationarily supported rollers, and at stations #5 and #6, the latter another 45° angle station, the bottom folds are additionally press-set by oscillatable arm carried plates. The Y-creasing unit I to be described in detail hereinafter is also located at station #6 and operates during the rest interval of the mandrels or forms at this station to Y-crease the sides of the bag adjacent the mouth thereof, and at #7, another vertical station, the completed bags are stripped from the forms or mandrels by the stripping unit J also to be described in detail hereinafter. Station #8, another 45° station, is a dead station through which the stripped mandrels pass in transit to the blank receiving station #1.

The first or side fold unit G positioned at station #2 is supported on an extension 171 of the upper frame portion 7, a suitable mounting bracket 172 being secured to said extension and serving to rockably support a shaft 173 to which a rocking motion is imparted during each rest interval of the turret through the medium of a crank 174 secured on the shaft, and pitman and roller connections 175 with a grooved plate cam 176 mounted on the cam shaft 29.

Another frame bracket 177 is secured to the frame extension 171 and extends forwardly therefrom. Individual clamp brackets 178 are secured to the bracket 177 and stationarily support a pair of spaced bars 179 disposed parallel and in a generally radial position with respect to the turret. Each bar 179 stationarily supports a side wing or plate 180 and these plates are so positioned and spaced that they form a folding tunnel just wide enough to receive the forms or mandrels 18 and the foil blank clamped thereto in a manner later to be described.

The bracket 177 also carries individual shaft bearings 181 each of which supports a rock shaft 182 which is cut away along the axis thereof so that the folder blade 183 or 184 carried thereby and movable therewith presents an edge centered on the axis of the particular shaft 182 and so positioned as to lie at one trailing corner of a particular form or mandrel presented at this station. One of the rock shaft carried blades 183 is relatively narrow, and the other 184 thereof is wider. These blades are normally disposed at a slight flare or outward angle with respect to an oncoming mandrel so that the portions of the foil blanks extending beyond the sides of the advance face of the respective form or mandrel will be engaged by these blades and by the wings 180 and folded into planes paralleling the plane of rotation of the turret. Thus when the shafts 182 are rocked about their axes, the blades 183, 184 will pivot about the corners of the mandrels and fold the trailing edge portions of the blank about the trailing face of the form or mandrel. See Figures 1, 2, and 30 to 33.

Each shaft 182 carries an eccentric gear segment 185, and these segments mesh in such a manner that the shaft supporting the narrow blade 183 is moved more rapidly than the shaft carrying the wider blade 184 so that the narrow blade will complete its fold in advance of and will not interfere with the folding function of the wider blade. One of the shafts 182 carries a bevel pinion 186 which meshes with and has rocking movement imparted thereto by a bevel gear 187 mounted on the shaft 173.

Means is provided for clamping the foil blank to the advance face of the form or mandrel, and this means is hereinafter referred to as a body clamp. This means becomes effective before the respective mandrels move from the blank receiving station #1 and remains effective for clamping the foil to the forms or mandrels through stations #1, 2, 3, 4, 5 and 6, being rendered ineffective at station #7 so as to permit stripping of the completed bag. Means is also provided for clamping the side seam formed by operation of the first or side fold unit G along the trailing face of the form or mandrel. This means is hereinafter referred to as a seam clamp, and this means becomes effective before the respective forms or mandrels leave station #2 and remains effective through stations #3, 4, 5 and 6, being rendered ineffective at station #7 so as to permit stripping of the completed bag.

Each body clamp equipment includes a rectangular clamp plate 188 of a size for substantially covering the advance face of the respective form or mandrel 18 and each seam clamp includes an elongated narrow clamp member 189 which opposes a portion of the trailing face of the respective form or mandrel and is adapted to overlie the edges of the foil blank which are overlapped in the formation of the side or body seam of the bag. It is to be understood that each narrow seam clamp member 189, in overlying and clamping together edge portions of the bag blank overlapped at the back or trailing face of the mandrel, does not overlie and press the line of adhesive applied to the blank edge by the applicator blade 114, this line of adhesive being disposed between the overlapped blank edges at one side of said seam clamp for a purpose that will later become apparent. Each body clamp plate 188 is pivoted as at 190 to a carrier arm 191 which is in turn pivoted at its inner end to the mounting ears 21 of the particular mandrel or form unit, and each seam clamp includes a similar carrier arm 192 pivoted at its inner end to the respective mounting ears 22 and which is pivoted at its outer end as at 193 to the respective seam clamp. Each of the arms 191 and 192 is extended beyond its pivotal connection with the respective clamp element as at 194, and spring elements 195 are interposed between the clamp elements and these extended ends so as to urge the inner ends of these elements toward their respective carrying arms so that in the movements of the clamping elements toward and from the forms, the outer extremities of the clamping elements will be the first to effect engagement during movement toward the form and the last to leave engagement in movements away from said forms. It will be noted that the seam clamp carrying arms 192 are crooked as at 196 so as to allow these clamping elements to swing a considerable distance inwardly toward the respective form or mandrel and thus accentuate the engagement of the outer extremity of these seam clamps in advance of the remainder thereof. It will be noted also that each clamping element is equipped with rubber facing strips 197 so as to facilitate the clamping function and assure against slippage of the foil portions clamped thereby.

A crank member 198 is secured to each body clamp and includes a cam engaging roller 199 at its free end. The cranks 198 are constantly urged inwardly, or in a direction for applying the body clamp plates to the respective forms, by springs 200 connected between the respective cranks and the hub of the turret. A similar crank 201 is attached to each seam clamp arm and has a roller 202 at its end, and these cranks are constantly urged in a direction for applying the seam clamps to the respective forms by springs 203 connected between the respective cranks and the turret hub.

A body clamp controlling cam 204 is affixed upon one end of a shaft 205 mounted in and projecting at its ends from the turret sleeve 14. This cam is formed to present a gradual eccentric lift surface 206 disposed to effect a release of the body clamps at stations #7 and 8, see Figures 2 and 34, and a receding portion 207 disposed at station #1. While this receding portion drops a considerable distance from the cam crest just in advance of station #1, it is so proportioned that when the respective form or mandrel is at rest at station #1 this receding surface will serve to hold the body clamp out of engagement with the mandrel or form face in the manner illustrated in Figure 2.

A crank 208 is secured on the other extended end of the shaft 205 and is pitman and roller connected as at 209 with a grooved plate cam 210 secured on a cam shaft 211 rotatable in bearings 212 in a bracket 213 secured upon the lower frame portion 6.

A seam clamp control cam 214 is oscillatably mounted on a reduced bearing portion 215 of the hub bearing 8. This cam is formed to present a lift surface 216 effective at station #7 to lift the respective seam clamp and permit stripping of the completed bag from the form or mandrel 18, a slightly receding portion 217 beyond station #7 and which serves to permit the seam clamp to seat against the respective form or mandrel through the portion of the turret movement including stations #8 and 1, and at station #2 this cam includes an accentuated lift hump 218 which serves to widely space the seam clamp from the particular form presented at this station so that it will not interfere with the side or body folding operation upon the foil blank clamped to the particular form or mandrel. The cam 214 is pitman and roller connected as at 219 to a grooved plate cam 220 secured upon the shaft 29. It will be noted also that the cam 220 is provided at its periphery with a sprocket portion forming a part of the sprocket and chain driving equipment 36 hereinbefore referred to. See Figure 35.

The clamp control cams 204 and 214 are normally stationary, that is, they are stationary while the turret structure is being indexed, station to station. It will be obvious that each body clamp plate 188 should be moved into foil blank clamping relation before any movement of the particular mandrel away from station #1 takes place so that displacement of the blank to be folded is assured against. It will be obvious also that each seam clamp should be applied to secure the seam formed by the side or body folding operation immediately after that operation is completed. For these reasons the crank and cam controls 209, 210 and 219, 220 are provided for at the proper moment imparting a 15° to 20° counterclockwise movement to the associated control cams 204 and 214, this movement being sufficient to free the respective body and seam clamps to enable their actuating springs to effect the clamping action referred to. The parts are so timed that as the turret is indexed the cams 204, 214 will move back to their normal positions so that the cycle can be repeated at the next rest interval of the turret structure.

*The second or bottom fold unit H*

The second or bottom fold unit H includes a bracket 221 secured on top of the upper frame portion 7 and having a vertical leg portion providing bearing as at 222 for a horizontal rock shaft 223. The bracket also includes a horizontal portion from which a pair of bearings 224 depend, and these bearings form additional support for the shaft 223 and bearing for another shaft 225 offset upwardly and laterally with respect to the shaft 223. The shafts 223 and 225 are gear-coupled as at 226 so as to rock together in opposite directions.

The shaft 225 carries a crank arm 227 having a folder blade 228 adjustably mounted thereon, and the shaft 223 carries a similar but shorter crank arm 229 having a folder blade 230 adjustably mounted thereon and including a fold seating roller 231 rotatably mounted at the engaging edge portion thereof.

An actuator crank 232 is secured upon the shaft 223 and is suitably oscillated by pitman and roller equipment 233 engaged with a groove plate cam 234 secured upon the shaft 211. See Figures 2, 3, and 4.

The horizontal portion of the bracket 221 also carries a pair of depending brackets 235 which rockably support spaced shafts 236, each carrying a crank arm 237 of adjustable length and having a tucker blade 238 pivotally attached thereto as at 239. A guide rod 240 projects from each blade 238 in a direction generally parallel the axis of the turret and is slidable in a guide bearing 241 pivotally supported on a hanger rod 242 suspended from the horizontal portion of the bracket 221. Another crank 243 is secured upon each shaft 236, and each crank 243 is connected by a link 244 and a slot and clamp nut connection 245 with a crank lever 246, both said levers being secured upon a rock shaft 247 rockably supported on the vertical portion of the bracket 221. The shaft 247 also has an actuator crank arm 248 which is connected by a link 249, slide-guided at 250 on the upper frame portion 7, and a pitman and roller equipment 251 with a grooved cam plate 252 secured upon the shaft 211.

As each form or mandrel 18 is presented at station #3 with the ends of the foil blank now folded in tubular form about the mandrel and extending from the outer end thereof a sufficient distance to permit the formation of the bottom folds necessary to complete the bag, the cam, pitman, crank and link connections first operate to move the tucker blades 238 toward each other to tuck in the side portions of the rectangular foil tube, see Figure 36; the blade 228 is then moved in to fold over the trailing flap, see Figure 33; and then the roller carrying blade 230 is swung in to complete the bottom fold. As the mandrel moves away from station #3 the bottom folds are engaged in rolling contact by the roller 231 in a manner tending to set the fold. By reason of the provision of the guides 241 and the rods 240, a compound movement is imparted to the tucker blades 238 serving to swing them into and out of tucking position without moving the blade faces to any great extent out of parallel relation with the opposed end surface of the particular form or mandrel presented at this station.

Adjacent station #4 a bag bottom press roller mounting bracket 253 is supported on frame studs 254 secured to and extending forwardly from the upper frame portion 7. The bracket is arcuate in shape and is disposed concentric with respect to the turret axes. The bracket is provided with a plurality of edge grooves 255 in which are adjustably mounted opposed roller supporting arms 256, and a rubber faced presser roller 257 is mounted between each opposed pair of mounting arms. In this particular illustration, three such rollers are shown and the first encountered roller is disposed at station #4. The two remaining rollers are encountered after a given form leaves station #4 and during the first portion of its travel toward station #5.

At the end of the bracket overlying station #4 there is secured a supporting shelf plate 258 which is so disposed that its upper surface perfectly alines with the trailing surface of a form or mandrel presented at this station. It will be remembered that it is on this trailing surface that the body seam of the bag is formed. For the purpose of setting this seam, there is provided a setting roller 259 carried at the free end of a short arm 260 which is pivoted to the free end of a long arm 261, said short arm being constantly urged by a spring 262 in a direction for tightly engaging the roller 259 with the shelf plate 258 or the respective side seam. The other end of the long arm is secured to a shaft 263 rockably supported in bearings 264 mounted on a bracket 265 attached to the lower frame part 6.

A crank arm 266 is connected by an adjustable slot and screw connection 267 and through pitman and roller equipment 268 with a grooved plate cam 269 mounted upon the shaft 211. It will be obvious that as the crank 266 is oscillated the arm 261 will be moved inwardly and outwardly to permit the seam setting roller 259 to roll over and set the side seam. The roller 259 rolls over the portions of the overlapped blank edges which have the line of adhesive between them and which lie close beside the respective seam clamp member 189 by which said overlapped edges are held together. Each time the arm 261 is returned to its normal position the roller will move out of engagement with the particular form or mandrel and will be supported on the shelf plate 258 in the manner illustrated in Figure 5 of the drawings.

The shaft 263 also carries a cam 270 which contacts with a roller 271 carried by a crank arm 272 secured on a rock shaft 273. The shaft 273 is gear-connected as at 274 with a companion rock shaft 275 and both shafts are rockably mounted in bearings 276 supported on the bracket 265. The shafts 273 and 275, which rock together in opposite directions, carry presser arms 277 which project in opposite directions. Each arm 277 carries a presser plate 278 at its extremity, one said plate being positioned for engagement with a form or mandrel at station #5 and the other with a form or mandrel positioned at station #6. A spring 279 constantly urges the crank roller 271 into engagement with the actuating cam 270. Each presser plate preferably carries a heater unit 278ᵃ.

The bag mouth Y-creasing unit I

Adjacent station #6 a Y-creasing unit supporting bracket 280 is secured to the lower frame portion 6, the unit supported by this bracket being effective at station #6. Bearing standards 281 are supported on this bracket and are disposed in spaced parallel relation so that the mandrels or forms 18 carried by the turret can pass between them. Shafts 282 are rockably mounted on the standards 281 and each carries a crank arm 283 to the free end of which a Y-creaser plate 284 is pivotally connected as at 285. See Figures 2 and 22. Each plate 284 has its face portion equipped with a Y-crease rib 286 which opposes the rubber inlays 23 formed in the front and rear edge surfaces of the forms or mandrels 18.

Each shaft 282 carries a bevel gear 287 and these gears mesh with bevel pinions 288 carried on a cross shaft 289 rockably supported in a bearing bracket 290 secured upon the bracket 280. An operating crank 291 is secured upon the shaft 289 and is connected by a link 292 with a crank arm 293 secured upon the rock shaft 275 so that the rocking motion of the shaft 275 will be transmitted to the shaft 289.

The parts are so timed that whenever a form or mandrel 18 is presented at station #6 the shafts 282 will be rocked to press the plate ribs 286 against the rubber inlays 23 and thereby form Y-creases 294 in the side edges of the bag 295 at the mouth thereof, as illustrated in Figure 24. By reason of the provision of these creases in the mouth portion of the bag the flat folding of the mouth of the bag as at 296 is greatly facilitated. See Figure 25.

Completed bag stripping unit J

Adjacent station #7 a supporting bracket 297 is secured to the lower frame part 6. This bracket supports a pair of spaced bearings 298 in which a shaft 299 is rotatably mounted. This shaft carries a bevel gear 300 and a pair of grooved pulleys 301. Rotation is imparted to this shaft through the medium of a bevel gear 302 which meshes with the gear 300 and is carried on a cross shaft 303 rotatable in suitable bearings 304 and having sprocket and chain driving connection 305, 306 with the cam shaft 29. See Figures 1, 4, and 29 of the drawings.

A pair of upstanding arms 307 are pivoted at their lower ends as at 308 in suitable bearings supported on the bracket 297 and each arm includes a depending stop lug 309 movable between limiting screws 310 adapted to limit swinging movement of the members 307 inwardly and outwardly, toward and from each other. Each member 307 carries a rubber faced stripper roller 311 at its upper end. Each roller includes a bevel receiving end 312 and is recessed as at 313 at the peripheral portion thereof which opposes the edge surface of a form of mandrel 18 presented at station #7 so that it will engage only at the corners of the respective mandrel sides as indicated at 314. Each stripper roller is mounted on a short shaft 315 rotatably supported at the upper end of the respective arm and carrying a grooved driving pulley 316 to which rotation is imparted through a suitable belt connection 317 with one of the before mentioned grooved pulleys 301.

Each time a form or mandrel 18 bearing a completed bag is presented at station #7 the corners of the bag on the form will be engaged by the rotating stripper rollers 311 and stripped from the form. The stripped bags may be collected by hand or may be deposited on any suitable take-off conveyor or chute equipment (not shown).

As has been previously described, power is applied to the cam shaft 29 direct from the power unit D, and the rotation of the cam shaft 29 is imparted to the cam shaft 211 by chain and sprocket connections 318. See Figures 3 and 29.

In order to overcome flywheel effect of the Geneva wheel 24 any suitable braking equipment may be employed. One acceptable example of such equipment is illustrated in Figures 46 and 47 of the drawings. This equipment includes a collar 319 clamped as at 320 upon the rear end of the bearing hub 8 and including a downwardly extended anchor lug 321. Opposed half circular brake shoe elements 322 are provided and are pivotally connected together and to the anchor lug 321 as at 323. The brake shoe elements encircle and frictionally engage a brake drum 324 secured as at 325 to the Geneva wheel 24. The brake shoe elements are yieldably pressed together as at 326 to constantly exert frictional drag upon the brake drum and Geneva wheel for the purpose specified.

In Figure 29 of the drawings there is illustrated a means by which the Geneva wheel and machine turret can be indexed manually. In order to permit this manual actuation independent of the power drive connections, the driven pulley 32 forming a part of the power drive connections and the shaft 29 on which it is mounted have incorporated therebetween an overrunning clutch equipment generally designated 327 and illustrated in detail in Figures 48 and 49 of the drawings. By reason of the provision of this clutch equipment, when rotation is applied to the pulley 32, it will be transmitted through the clutch equipment to the shaft 29, but, when the shaft 29 is rotated manually, by actuation of the hand wheel 23, said clutch equipment will permit the shaft to rotate freely within the pulley 32.

*Operation*

As the foil web 46 from which the packages or cups are to be formed is drawn from the spool 45 by the opposed upper and lower feed rollers 134, 132, aided by the frictionally driven roller 47, said web is fed horizontally through the web feeding, cutting, and pasting unit F, passing between the upper and lower guide members 74 and 75 thereof. Each time a length of web sufficient for the formation of a bag or cup blank has been fed through the feed rollers 132, 134 the upper set of rollers 134 are lifted from engagement with the web to discontinue the feeding thereof in the manner hereinbefore described, and as soon as this releasing of the web takes place the roller 62 will gravitate and draw the free web backwardly. The downward movement of the roller 62 and the arm by which it is carried also serves to apply the brake 65 and prevent overrunning of the web supply spool. The slight amount of backward pull on the web 46 is sufficient to cause the counterweighted rollers 162 to depress the slitted portions of the web 63 so that they will engage the abutment members 164, in the manner illustrated in Figure 17 of the drawings, and thereby perfectly register a blank length over the receiving form and in position for being severed across the advance pair of web defining slits 163. After the web length has been thus registered, the knife 146 descends and severs the blank length disposed over the receiving form 18 in the manner illustrated in the said Figure 17.

Each time the web comes to rest in the registering position illustrated in Figure 17 of the drawings, the adhesive applying equipment 113, 114, illustrated in detail in Figures 17, 18 and 21, is moved upwardly into engagement with the under surface of the web for the purpose of applying the adhesive 93 to said web. The control cam for actuating the adhesive applicator is so formed that it rapidly lifts the applicator devices from their immersed condition in the adhesive bath 93 to a point short of contact with the web, then holds said devices for an interval of time in their spaced relation with the web so as to permit draining off of surplus adhesive, and then moves said devices into contact with the web. By this two-step movement of the paste applicator devices and the resultant draining off of surplus adhesive, application of an undesirable surplus of adhesive is avoided.

It will be observed by reference to Figure 1 of the drawings that the body clamp 188 is separated from the upper face of the receiving form 18 at station #1 at the time the web blank is fed over the form and registered thereon. After the blank is positioned over the receiving form the cam member 204 is rotated about 15° counter-clockwise so that the cam surface 207 will move away from the crank roller 199 and permit the body clamp to engage and securely hold the registered and severed blank. This applied condition of the body clamp pertains throughout stations #1, 2, 3, 4, 5 and 6.

As the turret is indexed from station #1 to station #2 the portions of the blank projecting from the sides of the form will contact the stationary plates 180 at the first forming station #2 as the form moves between them and these projected blank portions will be folded in the manner illustrates in Figures 32 and 50 of the drawings. After the form comes to rest at the first forming station, as shown in Figure 32, the oscillatable folder blades 183, 184 will move to the position illustrated in Figure 33 and complete the first forming or side folding operation in the manner illustrated in the said Figure 33 and in Figure 51. In order to assure proper folding of the overlapping flap portions by the blades 183, 184, said blades are moved by eccentric gear sectors 185 which cause the blade 183 to move more rapidly than the blade 184 thereby to assure completion of its function ahead of completion of the function of the blade 184.

It will be observed by reference to Figure 1 of the drawings that the seam clamp 189 is applied to the first of the forms at the blank receiving station #1 but is spaced from the form at station #2 so as to permit freedom of movement of the folder blades 183, 184. Each seam clamp is held away at station #2 by the hump 218 of the cam 214. Just before the turret is indexed to move the form from station #2 the cam 214 is rotated counter-clockwise about 15° from the full line position illustrated in Figure 35 of the drawings to the dotted line position illustrated therein so as to permit the seam clamp to engage and secure the overlapped seam formed by the operation of the folder blades 183, 184. The seam clamping condition of the seam clamp pertains from the time of application at station #2 through stations #3, 4, 5 and 6.

The turret is next indexed to present the form at the bottom closing station #3. After the form comes to rest at this station the side tucker blades 238, best illustrated in Figures 4 and 36 of the drawings, are moved in to fold in the sides of the end or bottom in the manner illustrated in Figure 52. Following withdrawal of the blades 238, the blade 228 is moved in to fold down the trailing face portion including the body seam, after which the blade 230 which carries the roller 231 will be actuated to make the final fold and complete the bottom. See Figures 38, 53 and 54. The turret is next indexed to present the form at station #4 and as it moves away from station #3 the formed bottom will drag over the now stationary roller 231 so that said roller will serve to set the bottom folds.

After the form comes to rest at station #4 the arm 261 will be actuated to move the seam pressing roller 259 off the supporting shelf 268 once along and then back over the body seam for the purpose of securely sealing said seam. It is to be understood, of course, that the various bottom fold portions and the side seam have had adhesive suitably applied thereto by the applicator devices 113, 114 in the manner hereinbefore described. If desired, the roller 259 can be heated or other heat applying means can be employed at station #4 to additionally set the seal of the side seam. As the turret is indexed to move the form from station #4 to station #5 the bag bottom folds are dragged under stationary rollers 257 which serve to additionally secure and set the seal of said bottom folds.

Figure 2:
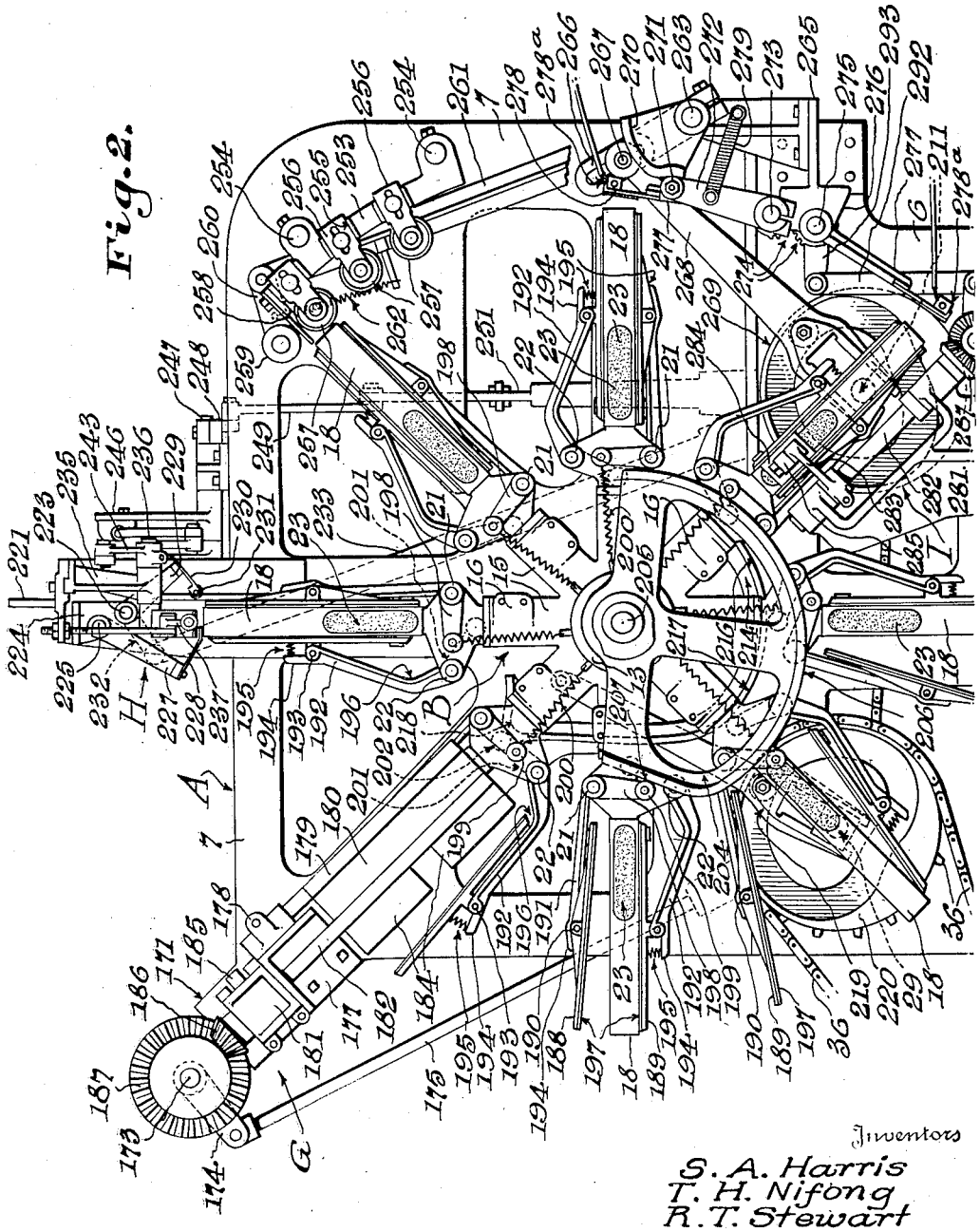
Figure 2 is an enlarged front elevation illustrating the mandrel carrying turret and the several folding mechanisms.
Figure 3:
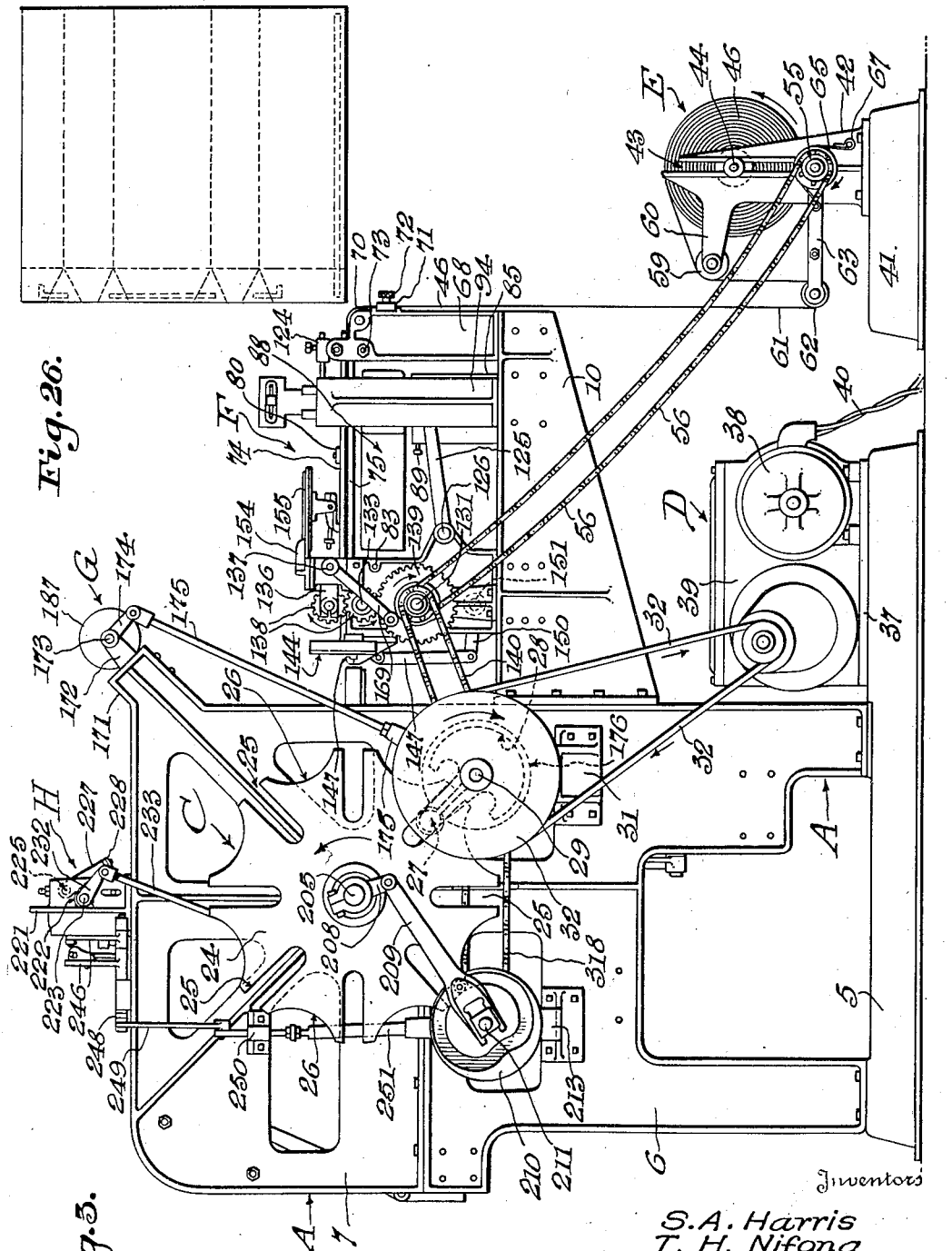
Figure 3 is a rear elevation.

At station #5 one of the heated bottom presser plates 278 is pressed tightly against the bag bottom to additionally assure perfect sealing thereof, see Figures 2, 5 and 6, and this bottom pressing step is repeated by the heated plate 278 positioned at station #6.

In addition to the bottom pressing function, Y-creases are formed in the sides of the bag adjacent the mouth at station #6. See Figures 1, 2, and 22 through 24. These creases facilitate subsequent folding in of the bag mouth in the manner illustrated in Figure 25.

As the turret is indexed to move the form from station #6 to station #7 the cams 204 and 214 function to unseat the body clamp and also the seam clamp so as to free the now completely formed cup or bag. See Figure 1. As the form moves into station #7 it will engage the beveled receiving ends 312 of the rotating stripper rolls 311, and these rolls, engaging only at the corners of the formed bag or cup as illustrated in Figure 55, and rotating in the direction illustrated in Figure 4, will strip the bag from the form and deposit it onto a suitable take-off chute or conveyor (not shown).

It is of course to be understood that the details of structure and arrangement of parts may be variously changed and modified without departing from the spirit and scope of our invention.

We claim:

1. In a bag making machine, a turret having radially projected equidistantly spaced forms projecting therefrom and each terminating radially in a bag bottom opposing end wall, means for indexing said turret to present the forms successively at a plurality of stations, means at one station to feed a blank to a form presented at that station, means for clamping each blank to the respective form with an end of the blank projecting radially beyond the form end wall, means at another station to fold each blank about the sides of the form carrying the same to form a sleeve having a side seam at a trailing face of the form and an open end extended radially beyond said form end wall, means to clamp the seam, means at another station to fold the radially extended open sleeve end over the end and against the end wall of the form to form the bottom of the bag, side seam pressing means, means for pressing each bottom against the end wall over which it is folded, and means for stripping the finished bag from the form.

2. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means for stripping the finished bag from the form, said side folding means including a pair of stationary blades disposed in laterally spaced relation and parallel each other and the plane in which the turret moves to present forms at the side folding station and between which the form moves in approaching the side folding station, and a pair of hingedly mounted folder blades normally disposed in planes generally paralleling and extending in advance of said stationary blades.

3. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means for stripping the finished bag from the form, said side folding means including a pair of stationary blades disposed in laterally spaced relation and parallel each other and the plane in which the turret moves to present forms at the side folding station and between which the form moves in approaching the side folding station, and a pair of hingedly mounted folder blades normally disposed in planes generally paralleling and extending in advance of said stationary blades, and means for swinging one said swingably mounted blade faster than the other to cause its folding function to be completed ahead of the folding function of the other swingable blade.

4. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means for stripping the finished bag from the form, said side folding means including a pair of stationary blades disposed in laterally spaced relation and parallel each other and the plane in which the turret moves to present forms at the side folding station and between which the form moves in approaching the side folding station, and a pair of hingedly mounted folder blades normally disposed in planes generally paralleling and extending in advance of said stationary blades, and means including meshing eccentric gear sectors for swinging one said swingably mounted blade faster than the other to cause its folding function to be completed ahead of the folding function of the other swingable blade.

5. In a bag making machine, a turret having radially projected equidistantly spaced forms projecting therefrom and each terminating radially in a bag bottom opposing end wall, means for indexing said turret to present the forms successively at a plurality of stations, means at one station to feed a blank to a form presented at that station, means for clamping each blank to the respective form with an end of the blank projecting radially beyond the form end wall, means at another station to fold each blank about the sides of the form carrying the same to form a sleeve having a side seam at a trailing face of the form and an open end extended radially beyond said form end wall, means to clamp the seam, means at another station to fold the radially extended open sleeve end over the end and against the end wall of the form to form the bottom of the bag, side seam pressing means, means for pressing each bottom against the end wall over which it is folded, means for stripping the finished bag from the form, said open sleeve end folding means including a pair of simultaneously operable side end tuckers and a pair of successively operable end face folders.

6. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means for stripping the finished bag from the form, said end folding means including a pair of simultaneously operable side end tuckers, a pair of successively operable end face folders, and a bottom press drag roller carried by the last operable of the successively operable end face folders.

7. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means for stripping the finished bag from the form, said end folding means including a pair of simultaneously operable side end tuckers, a pair of successively operable end face folders, and a bottom press drag roller carried by the last operable of the successively operable end face folders and engageable with each bag bottom twice, once during movement of the end face folder by which it is carried and again during movement of the form away from the end folding station.

8. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form and an open end extended radially beyond said form, means to clamp the seam, means at another station to fold the radially extended open sleeve end over the end of the form to form the bottom of the bag, side seam and bottom pressing means, means for stripping the finished bag from the form, said open sleeve end folding means including a pair of simultaneously operable side end tuckers, and means for swingably and slidably mounting said tuckers to cause them to move in directions generally paralleling the form end.

9. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, and means for stripping the finished bag from the form, said side seam pressing means including an oscillatable arm and a spring pressed roller carried thereby and presented for engagement with said side seam.

10. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means for stripping the finished bag from the form, said side seam pressing means including an oscillatable arm and a spring pressed roller carried thereby and presented for engagement with said side seam, and a shelf disposed to align with the trailing face of a form presented at the seam pressing station and serving to support the spring pressed roller when the arm is in its normal inactive position.

11. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form and an open end extended radially beyond said form, means to clamp the seams, means at another station to fold the radially extended open sleeve end over the end of the form to form the bottom of the bag, side seam and bottom pressing means, and means for stripping the finished bag from the form, said bottom pressing means including swingably mounted presser plates engageable with bag bottoms at successive stations.

12. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form and an open end extended radially beyond said form, means to clamp the seam, means at another station to fold the radially extended open sleeve end over the end of the form to form the bottom of the bag, side seam and bottom pressing means, and means for stripping the finished bag from the form, said bottom pressing means including swingably mounted presser plates engageable with bag bottoms at successive stations, and means including meshing gear sectors for simultaneously moving the presser plates toward or from the bag bottoms.

13. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, and means for stripping the finished bag from the form, said side seam pressing means including an oscillatable arm and a spring pressed roller carried thereby and presented for engagement with said side seam, said bottom pressing means including swingably mounted presser plates engageable with bag bottoms at successive stations, and means operated by movement of said oscillatable arm for imparting movement to said presser plates.

14. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means operable while the bag is still on said form for forming Y-creases in the sides of the formed bag adjacent its mouth portion to facilitate subsequent mouth closing, and means for stripping the finished bag from the form.

15. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form, means to clamp the seam, means at another station to fold the extended blank portion over the end of the form to form the bottom of the bag, side seam and bottom pressing means, means for forming Y-creases in the sides of the formed bag adjacent its mouth portion to facilitate subsequent mouth closing, means for stripping the finished bag from the form, said side seam pressing means including an oscillatable arm and a spring pressed roller carried thereby and presented for engagement with said side seam, said bottom pressing means including swingably mounted presser plates engageable with bag bottoms at successive stations, and means operated by movement of said oscillatable arm for imparting movement to said presser plates and to said Y-creasing means.

16. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form and an open end extended radially beyond said form, means to clamp the seam, means at another station to fold the radially extended open sleeve end over the end of the form to form the bottom of the bag, side seam and bottom pressing means, and means at another station for stripping the finished bag from the form, said stripping means including a pair of constantly rotated friction rollers stationarily mounted at the stripping station and between which the radially extended extremity of each form passes as it moves into said stripping station.

17. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form and an open end extended radially beyond said form, means to clamp the seam, means at another station to fold the radially extended open sleeve end over the end of the form to form the bottom of the bag, side seam and bottom pressing means, and means at another station for stripping the finished bag from the form, said stripping means including a pair of constantly rotated friction rollers stationarily mounted at the stripping station and between which the radially extended extremity of each form passes as it moves into said stripping station and each having bevelled receiving end portions.

18. In a bag making machine, a turret having radially projected equidistantly spaced forms projecting therefrom, means for indexing said turret to present the forms successively at a plurality of stations, means at one station to feed a blank to a form, means for clamping the blank to the form with an end of the blank projecting radially beyond the form, means at another station to fold the blank about the sides of the form to form a sleeve having a side seam at a trailing face of the form and an open end extended radially beyond said form, means to clamp the seam, means at another station to fold the radially extended open sleeve end over the end of the form to form the bottom of the bag, side seam and bottom pressing means, and means at another station for stripping the finished bag from the form, said stripping means including a pair of constantly rotated friction rollers stationarily mounted at the stripping station and between which the radially extended extremity of each form passes as it moves into said stripping station and each having bevelled receiving end portions and face clearances effective to cause the rollers to engage only at the corners of the formed bag.

19. In a bag making machine, a turret rotatable step by step and carrying a plurality of forms projecting radially therefrom in equidistantly spaced relation so as to present side faces and advance and trailing faces, body and seam clamps opposed to the advance and trailing faces of each form and including actuator crank portions for controlling movement of said clamps toward and from said forms, means for indexing the turret to present the forms successively at individual forming stations, normally stationary cam means directly engaged by the crank portions during movement of the turret to control the positioning of the clamps at certain stations, and means for moving said cam means during rest intervals of the turret to control the positioning of the clamps at certain stations.

20. In a bag making machine, a turret rotatable step by step and carrying a plurality of forms projecting radially therefrom in equidistantly spaced relation so as to present side faces and advance and trailing faces, body and seam clamps opposed to the advance and trailing faces of each form and including actuator crank portions for controlling movement of said clamps toward and from said forms, means for indexing the turret to present the forms successively at individual stations at one of which a bag blank is fed to the form at another of which said blank is side folded to form a sleeve extending from the end of the form and having a side seam at the trailing face of the form, at another of which the extended sleeve portion is folded to form a bag bottom, and at another of which the formed bags are discharged from the forms, a single stationary cam directly engaged by each body clamp crank during movement of the associated form to the discharging station for effecting an opening of the body clamp and also effective while the forms are moving from said discharging station to the blank receiving station to hold the body clamp open, and means for moving said cam to permit the body clamp to close and grip a blank before the turret is moved from the receiving station.

21. In a bag making machine, a turret rotatable step by step and carrying a plurality of forms projecting radially therefrom in equidistantly spaced relation so as to present side faces and advance and trailing faces, body and seam clamps opposed to the advance and trailing faces of each form and including actuator crank portions for controlling movement of said clamps toward and from said forms, means for indexing the turret to present the forms successively at individual forming stations, normally stationary cam means directly engaged by the crank portions during movement of the turret to control the positioning of the clamps at certain stations, and means for moving said cam means about the axis of the turret during rest intervals of the turret to control the positioning of the clamps at certain stations.

22. In a bag making machine, a turret rotatable step by step and carrying a plurality of forms projecting radially therefrom in equidistantly spaced relation so as to present side faces and advance and trailing faces, body and seam clamps opposed to the advance and trailing faces of each form and including actuator crank portions for controlling movement of said clamps toward and from said forms, means for indexing the turret to present the forms successively at individual stations at one of which a bag blank is fed to the form at another of which said blank is side folded to form a sleeve extending from the end of the form and having a side seam at the trailing face of the form, at another of which the extended sleeve portion is folded to form a bag bottom, and at another of which the formed bags are discharged from the forms, a single stationary cam directly engaged by each body clamp crank during movement of the associated form to the discharging station for effecting an opening of the body clamp and also effective while the forms are moving from said discharging station to the blank receiving station to hold the body clamp open, and means for moving said cam about the axis of the turret to permit the body clamp to close and grip a blank before the turret is moved from the receiving station.

23. In a bag making machine, a turret rotatable step by step and carrying a plurality of forms projecting radially therefrom in equidistantly spaced relation so as to present side faces and advance and trailing faces, body and seam clamps opposed to the advance and trailing faces of each form and including actuator crank portions for controlling movement of said clamps toward and from said forms, means for indexing the turret to present the forms successively at individual stations at one of which a bag blank is fed to the form at another of which said blank is side folded to form a sleeve extending from the end of the form and having a side seam at the trailing face of the form, at another of which the extended sleeve portion is folded to form a bag bottom, and at another of which the formed bags are discharged from the forms, a single stationary cam directly engaged by each seam clamp crank during movement of the associated form to the side folding station for effecting an opening of the seam clamp and also effective while the forms are moving from said discharging station to the blank folding station to hold the body clamp open, and means for moving said cam about the axis of the turret to permit the seam clamp to close and grip a blank before the turret is moved from the side folding station.

24. In a bag making machine wherein is provided a traveling form carrier supporting spaced forms each presenting side faces an end face and advance and trailing faces, and a first folding station; folding means at said station for folding a blank held on the advance face of a form about said form to form a sleeve having a body seam along said trailing face, said means comprising a pair of opposed stationary blades disposed in parallel spaced relation and between which the form moves and effective during movement of the form to the station to fold projecting side portions of the blank over the form side faces, a folder blade mounted for swinging movement about an axis disposed adjacent the receiving edge portion of each stationary blade, and forming a continuation of said blade, and means for simultaneously swinging both blades to fold blank portions in overlapping relation over the trailing face of the form.

25. In a bag making machine wherein is provided a traveling form carrier supporting spaced forms each presenting side faces an end face and advance and trailing faces, and a first folding station; folding means at said station for folding a blank held on the advance face of a form about said form to form a sleeve having a body seam along said trailing face, said means comprising a pair of opposed stationary blades disposed in parallel spaced relation and between which the form moves and effective during movement of the form to the station to fold projecting side portions of the blank over the form side faces, a folder blade mounted for swinging movement about an axis disposed adjacent the receiving edge portion of each stationary blade, and forming a continuation of said blade, and means for simultaneously swinging both blades one faster than the other to fold blank portions in overlapping relation over the trailing face of the form.

26. In a bag making machine wherein is provided a traveling form carrier supporting spaced forms each presenting side faces an end face and advance and trailing faces, and a first folding station; folding means at said station for folding a blank held on the advance face of a form about said form to form a sleeve having a body seam along said trailing face, said means comprising a pair of opposed stationary plates between which the form moves and effective during movement of the form to the station to fold projecting side portions of the blank over the form side faces, a folder blade swingably disposed adjacent the receiving edge portion of each stationary plate, and means for simultaneously swinging both blades one faster than the other to fold blank portions in overlapping relation over the trailing face of the form, said last named means including intermeshing eccentric gear sectors individually secured to the blades, a pinion secured to one blade, a rock shaft, a pinion secured to the rock shaft and meshing with the first mentioned pinion, and means for imparting rocking movement to the rock shaft.

27. In a bag making machine wherein is provided a carrier movable from station to station and having spaced forms thereon presentable at said stations and each having side faces, an end face, and advance and trailing faces, means at one station for forming a blank on the form into the shape of a sleeve projecting beyond the end face and having a body seam along the trailing face, a bag bottom forming means at one said station comprising a pair of simultaneously operable side end tuckers, a pair of successively operable end face folders, and a bottom press drag roller carried by the last operable of the successively operable end face folders.

28. In a bag making machine wherein is provided a carrier movable from station to station and having spaced forms thereon presentable at said stations and each having side faces an end face and advance and trailing faces, means at one station for forming a blank on the form into the shape of a sleeve projecting beyond the end face and having a body seam along the trailing face, a bag bottom forming means at one said station comprising a pair of simultaneously operable side end tuckers, and means for swingably and slidably mounting said tuckers to cause them to move in directions generally paralleling the form end comprising a slide rod supporting each tucker, a pivotally mounted slide bearing for each rod, a rock shaft associated with each tucker, and a crank arm fixed on each rock shaft and pivotally connected with each rod.

29. In a bag making machine wherein is provided a carrier movable from station to station and having spaced forms thereon presentable at said stations and each having side faces an end face and advance and trailing faces, means at one station for forming a blank on the form into the shape of a sleeve projecting beyond the end face and having a body seam along the trailing face, a bag bottom forming means at one said station comprising a pair of simultaneusly operable side end tuckers, and means for swingably and slidably mounting said tuckers to cause them to move in directions generally paralleling the form end, said last named means including a rock shaft for each tucker, an adjustable length crank secured to each rock shaft and pivoted at its end to one tucker, means for rocking said shafts, a hanger rod associated with each tucker, and a slide bearing for each tucker pivotally mounted on the respective hanger rod 30. In a bag making machine wherein is provided a carrier movable from station to station and having spaced forms thereon presentable at said stations and each having side faces an end face and advance and training faces, means at one station for forming a blank on the form into the shape of a sleeve projecting beyond the end face and having a body seam along the trailing face, a bag bottom forming means at one said station comprising a pair of simultaneously operable side end tuckers, and means for swingably and slidably mounting said tuckers to cause them to move in directions generally paralleling the form end, said last named means including a rock shaft for each tucker, an adjustable length crank secured to each rock shaft and pivoted at its end to one tucker, a hanger rod associated with each tucker, a slide bearing for each tucker pivotally mounted on the respective hanger rod, and means including adjustable throw crank and rod connections for rocking said shafts.

31. In a bag making machine, means for forming bags having closed sides and bottom and an open mouth and including a traveling form having side faces an end and advance and trailing faces, yieldable inserts in said side faces at the portions over which the bag mouth is presented, and Y-creasing means engageable with the bag sides adjacent the mouth and over said inserts for creasing the bag to facilitate subsequent closing, said creasing means including spaced frame portions between which the form comes to rest with a bag thereon, a rock shaft mounted on each frame portion parallel and opposed to a form side face, a crank on each rock shaft and carrying a Y-creaser plate at its free end, and means to rock said shafts to move said plates into and out of contact with said bag.

32. In a bag making machine, means for forming bags having closed sides and bottom and an open mouth and including a traveling form having side faces an end and advance and trailing faces, yieldable inserts in said side faces at the portions over which the bag mouth is presented, and Y-creasing means engageable with the bag sides adjacent the mouth and over said inserts for creasing the bag to facilitate subsequent closing, said creasing means including spaced frame portions between which the form comes to rest with a bag thereon, a rock shaft mounted on each frame portion parallel and opposed to a form side face, a crank on each rock shaft and carrying a Y-creaser plate at its free end, and means to rock said shafts to move said plates into and out of contact with said bag, said creaser plates being disposed to present the Y-crease heads toward the bag bottom and the Y-crease standard toward and through the bag mouth end.

33. In a bag making machine, a rotatable turret having a plurality of radially disposed equidistantly spaced clamp sleeves, a form removably secured in each sleeve and including a shank portion receivable in said sleeve and a generally rectangular body portion presenting sides an end and advance and trailing faces, all of said sides and faces being tapered slightly toward said end.

34. In a bag making machine, a rotatable turret having a plurality of equidistantly spaced clamp sleeves having axes radially disposed, a form removably secured in each sleeve and including a shank portion removably receivable in said sleeve and a generally rectangular body portion presenting sides an end and advance and trailing faces, and rubber facing portions presented at said sides.

35. In a bag making machine, a rotatable turret having a plurality of radially disposed equidistantly spaced clamp sleeves, a form removably secured in each sleeve and including a shank portion receivable in said sleeve and a generally rectangular body portion presenting sides and end and advance and trailing faces, all of said sides and faces being tapered slightly toward said end, said form body portion being hollow and having suction breaking apertures in its end.

36. In a bag making machine, a rotatable turret having a plurality of radially disposed equidistantly spaced clamp sleeves, a form removably secured in each sleeve and including a shank portion receivable in said sleeve and a generally rectangular body portion presenting sides an end and advance and trailing faces, all of said sides and faces being tapered slightly toward said end, body clamp pivot lugs projecting from the shank adjacent the advance face of the form, and seam clamp pivot lugs projecting from the shank adjacent the trailing face of said form.

37. In a bag making machine, means for forming bags having closed sides and bottom and an open mouth and including a generally rectangular form about which the bags are formed and a movable carrier for successively presenting the form at forming and stripping stations, finished bag stripping means at the stripping station comprising a pair of stationarily mounted constantly rotated friction rollers between which the form moves at the stripping station, and each having beveled receiving end portions engaged by the form so it moves into the stripping station.

38. In a bag making machine, means for forming bags having closed sides and bottom and an open mouth and including a generally rectangular form about which the bags are formed and a movable carrier for successively presenting the form at forming and stripping stations, finished bag stripping means at the stripping station comprising a pair of stationarily mounted constantly rotated friction rollers between which the form moves at the stripping station, and each having beveled receiving end portions and face clearances effective to cause the rollers to engage only at the corners of the finished bag.

39. In a bag making machine, means for forming bags having closed sides and bottom and an open mouth and including a generally rectangular form about which the bags are formed and a movable carrier for successively presenting the form at forming and stripping stations, finished bag stripping means at the stripping station comprising a pair of constantly rotated friction rollers between which the form moves at the stripping station, an arm supporting each roller, means rotatably supporting each roller on the associated arm, means swingably supporting said arms to permit the rollers to swing toward and from each other, a drive shaft disposed between said arms, and power transmitting connections between said shaft and said rollers.

40. In a bag making machine, means for forming bags having closed sides and bottom and an open mouth and including a generally rectangular form about which the bags are formed and a movable carrier for successively presenting the form at forming and stripping stations, finished bag stripping means at the stripping station comprising a pair of constantly rotated friction rollers between which the form moves at the stripping station, an arm supporting each roller, means rotatably supporting each roller on the associated arm, means swingably supporting said arms to permit the rollers to swing toward and from each other, a drive shaft disposed between said arms, power transmitting connections between said shaft and said rollers, and adjustable stop means for limiting swinging movement of said arms.

41. In a bag making machine, means for forming bags having closed sides and bottom and an open mouth and including a generally rectangular form about which the bags are formed and a movable carrier for successively presenting the form at forming and stripping stations, finished bag stripping means at the stripping station comprising a pair of constantly rotated friction rollers between which the form moves at the stripping station, an arm supporting each roller, means rotatably supporting each roller on the associated arm, means swingably supporting said arms to permit the rollers to swing toward and from each other, a drive shaft disposed between said arms, and flexible belt and pulley power transmitting connections for driving said rollers from said shaft.

42. In a bag making machine, means for forming bags having closed sides and bottom and an open mouth and including a generally rectangular form about which the bags are formed and a movable carrier for successively presenting the form at forming and stripping stations, finished bag stripping means at the stripping station comprising a pair of constantly rotated friction rollers between which the form moves at the stripping station, an arm supporting each roller, means rotatably supporting each roller on the associated arm, means swingably supporting said arms to permit the rollers to swing toward and from each other, a drive shaft disposed between said arms, flexible belt and pulley power transmitting connections for driving said rollers from said shaft, and adjustable stop means for limiting swinging movement of said arms.

SAMUEL A. HARRIS.
THOMAS H. NIFONG.
RALPH T. STEWART.